(12) United States Patent
Kwok et al.

(10) Patent No.: US 9,813,960 B2
(45) Date of Patent: Nov. 7, 2017

(54) WI-FI CALLING USING SIP-IMS HANDSET AND EVOLVED PACKET DATA GATEWAY

(71) Applicant: T-Mobile USA, Inc., Bellevue, WA (US)

(72) Inventors: Ming Shan Kwok, Seattle, WA (US); Adnan Rahat, Newcastle, WA (US); Gunjan Nimbavikar, Bellevue, WA (US); Nayla Hamade, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 122 days.

(21) Appl. No.: 14/726,279

(22) Filed: May 29, 2015

(65) Prior Publication Data

US 2015/0350983 A1    Dec. 3, 2015

Related U.S. Application Data

(60) Provisional application No. 62/004,861, filed on May 29, 2014.

(51) Int. Cl.
*H04W 36/14*        (2009.01)
*H04L 29/06*        (2006.01)
(Continued)

(52) U.S. Cl.
CPC ......... *H04W 36/14* (2013.01); *H04L 65/1006* (2013.01); *H04L 65/1016* (2013.01);
(Continued)

(58) Field of Classification Search
CPC .............. H04W 36/14; H04W 36/0022; H04L 65/1069; H04L 6/1016
See application file for complete search history.

(56) References Cited

U.S. PATENT DOCUMENTS

2005/0227719  A1*  10/2005  Gunaratnam ......... H04W 48/18
                                                          455/510
2006/0046714  A1*  3/2006   Kalavade ................ H04M 3/54
                                                          455/428

(Continued)

OTHER PUBLICATIONS

Solution Brief—Launch Fully Integrated Voice Over WiFi* in a Fraction of the Time; Mitel (Hewlett Packard Enterprise) delivers Voice-over-WiFi* faster and with less disruption to existing network services; 2016.*

(Continued)

*Primary Examiner* — Hassan Kizou
*Assistant Examiner* — Deepa Belur
(74) *Attorney, Agent, or Firm* — Han Santos, PLLC; Elliott Y. Chen

(57) ABSTRACT

Wi-Fi calling using a mobile device and an evolved packet data gateway (ePDG) is described herein. For example, a mobile device may determine whether any LTE coverage is available, whether data roaming is available, whether a visited public land mobile network (VPLMN) is available, and whether a DNS query to a visited ePDG (VePDG) is successful. The mobile device may connect to the VePDG responsive to a determination that LTE coverage is available, that data roaming is available, that a VPLMN is available, and that the DNS query to the VePDG is successful. Otherwise, the mobile device may connect to a home ePDG (HePDG).

20 Claims, 14 Drawing Sheets

(51) Int. Cl.
 H04W 24/10 (2009.01)
 H04W 36/00 (2009.01)
 H04W 36/24 (2009.01)
(52) U.S. Cl.
 CPC .......... H04L 65/1069 (2013.01); H04L 65/80 (2013.01); H04W 24/10 (2013.01); H04W 36/0022 (2013.01); H04W 36/24 (2013.01)

(56) References Cited

U.S. PATENT DOCUMENTS

| | | | | |
|---|---|---|---|---|
| 2006/0294245 | A1* | 12/2006 | Raguparan | H04L 29/06027 709/227 |
| 2007/0268888 | A1* | 11/2007 | Shatzkamer | H04L 63/08 370/352 |
| 2009/0147772 | A1* | 6/2009 | Rao | H04L 12/1818 370/352 |
| 2009/0247137 | A1* | 10/2009 | Awad | H04M 3/2227 455/418 |
| 2010/0279714 | A1* | 11/2010 | Chin | H04W 68/12 455/458 |
| 2011/0261787 | A1* | 10/2011 | Bachmann | H04L 63/029 370/331 |
| 2012/0250585 | A1* | 10/2012 | Seetharaman | H04L 12/14 370/259 |
| 2013/0336288 | A1* | 12/2013 | Tu | H04W 36/0077 370/331 |
| 2014/0003450 | A1* | 1/2014 | Bentley | H04N 7/15 370/468 |
| 2014/0245403 | A1* | 8/2014 | Li | H04L 12/66 726/4 |
| 2015/0056973 | A1* | 2/2015 | Efrati | H04W 76/064 455/418 |
| 2015/0222627 | A1* | 8/2015 | Le Scouarnec | H04L 67/2814 726/10 |
| 2015/0230109 | A1* | 8/2015 | Socaciu | H04W 64/00 455/418 |
| 2015/0245388 | A1* | 8/2015 | Yerrabommanahalli | H04W 76/007 455/404.1 |
| 2015/0350983 | A1* | 12/2015 | Kwok | H04L 65/1069 370/331 |
| 2016/0037328 | A1* | 2/2016 | Raveendran | H04W 8/08 370/328 |
| 2016/0135116 | A1* | 5/2016 | Chen | H04W 48/14 455/450 |
| 2016/0262061 | A1* | 9/2016 | Chinthalapudi | H04W 36/0022 |
| 2016/0373944 | A1* | 12/2016 | Jain | H04L 43/50 |
| 2017/0005914 | A1* | 1/2017 | Edge | H04L 45/26 |
| 2017/0171783 | A1* | 6/2017 | Reddy | H04W 36/0022 |

OTHER PUBLICATIONS

Femtocell Networks: A Survey; Vikram Chandrasekhar and Jeffrey G. Andrews, The University of Texas at Austin Alan Gatherer, Texas Instruments; IEEE Communications Magazine, Sep. 2008.*

* cited by examiner

WI-FI CALLING USING SIP-IMS HANDSET AND EVOLVED PACKET DATA GATEWAY

CROSS REFERENCE TO RELATED PATENT APPLICATION

The present disclosure is a non-provisional application claiming the priority benefit of provisional application U.S. Patent Application No. 62/004,861, filed on May 29, 2014, which is incorporated by reference in its entirety.

BACKGROUND

The Internet Protocol (IP) Multimedia Subsystem (IMS) is an architectural framework for delivering IP multimedia services. Historically, mobile phones have provided voice call services over a circuit-switched network, rather than strictly over an IP packet-switched network. In recent years alternative methods of delivering voice or other multimedia services over IP have become available on smartphones, but they are not yet standardized across the industry. IMS is an architectural framework to provide such standardization. Moreover, IMS is intended to aid the access of multimedia and voice applications from wireless and wireline terminals. Wherever possible, Internet Engineering Task Force (IETF) protocols such as the Session Initiation Protocol (SIP), for example, are utilized to ease the integration of IMS with the Internet,

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
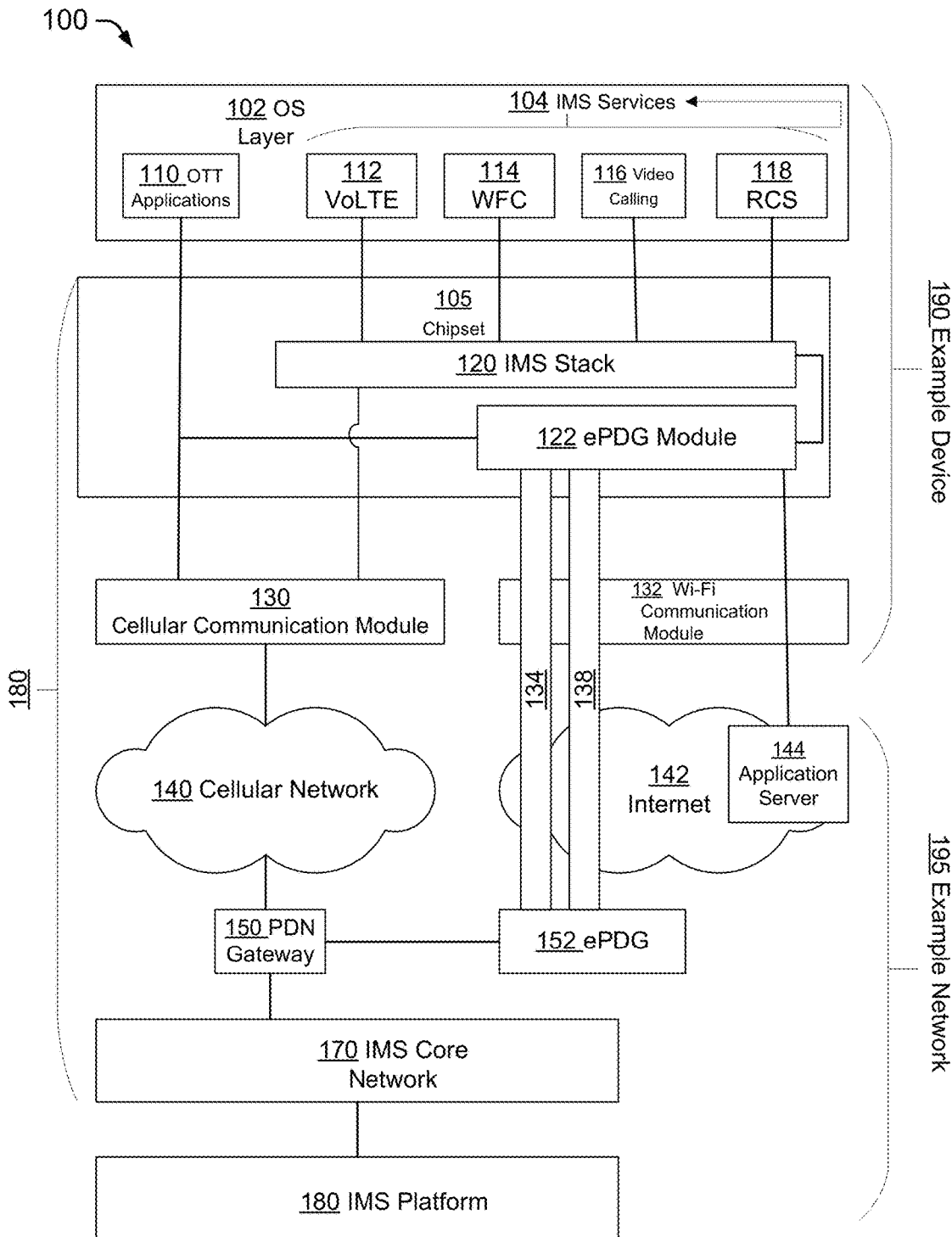
FIG. 1 is a diagram of an example IMS architecture with single IMS stack and evolved packet data gateway (ePDG) function supporting multiple IMS services in accordance with the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or non-transitory computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The terms "handset", "mobile device," "user equipment" and "user device" used herein are interchangeable and refer to a mobile communication device, e.g., a smartphone, used by a user for wireless communication. The term "ePDG" used herein denotes evolved package data gateway for Internet Protocol Security (IPSec) tunneling from a user device through an untrusted non-3GPP access network such as, for example, a Wi-Fi network or any access network utilizing unlicensed spectrum. The term "Wi-Fi calling" used herein denotes voice service to be carried through the IPSec tunnel. The term "video calling" used herein denotes IMS-based full duplex voice and simplex/full-duplex video media with tight synchronization between the constituent streams. The term "RCS" used herein denotes rich communication suite services defined by GSMA to be enabled through the ePDG connectivity.

Wi-Fi Calling Using SIP-IMS Handset

The present disclosure describes techniques that may be implemented in systems and methods of Wi-Fi calling using a SIP-IMS user device and ePDG. Moreover, embodiments of the techniques described herein may be implemented in a 4-protocol so that Wi-Fi calling using a user device and ePDG may be consummated.

FIG. 1 illustrates an example IMS architecture 100 with single IMS stack and ePDG function supporting multiple IMS services in accordance with the present disclosure. Example IMS architecture 100 may include an example device 190 and an example network 195, with a portion of example device 190 and a portion of example network 195 forming an IMS platform 180. Example network 195 may include an IMS core network 170, a packet data network (PDN) gateway (P-GW) 150, an ePDG 152, a cellular network 140 and the Internet 142, which may include an application server 144. Cellular network 140 may be communicatively connected to IMS core network 170 via P-GW 150. The Internet 142 may be communicatively connected to ePDG 152, which may be communicatively connected to IMS core network 170 via P-GW 150. Example network 195 may also include servers and back-end nodes 180 that provide a number of communication services to example device 190 through IMS core network 170.

Example device 190 may include a chipset 105, a cellular communication module 130, and a Wi-Fi communication module 132. Chipset 105 may include an IMS stack 120 and an ePDG module 122. IMS stack 120 may include an IMS transport and endpoint layer, which may be equivalent to the transport layer (layer 4) of the Open Systems Interconnection (OSI) model, a session control layer, which may be equivalent to the session layer (layer 5) of the OSI model, and an application server layer, which may be equivalent to the presentation and application layers (layers 6 and 7) of the OSI model. The ePDG module 122 may be capable of ePDG functions and connection management in accordance with the present disclosure. Cellular communication module 130 may be configured to establish communication with cellular network 140, e.g., to receive and/or make calls over cellular network 140. Wi-Fi communication module 132 may be configured to establish communication with Wi-Fi network 142, e.g., to receive and/or make calls over Wi-Fi network 142. Example device 190 may also include an application/operating system (OS) layer 102 which is executed by chipset 105 to provide multiple IMS services 140, in the application/OS layer 102, to a user of example device 190. One or more over-the-top (OTT) applications 110 may also be executed in the application/OS layer 102. The multiple IMS services 104 supported by example device 190 may include, for example, Voice over Long-Term Evolution (VoLTE) 112, Wi-Fi voice calling (WFC) 114, video calling 116 and rich communication services (RCS) 118.

Figure 2:
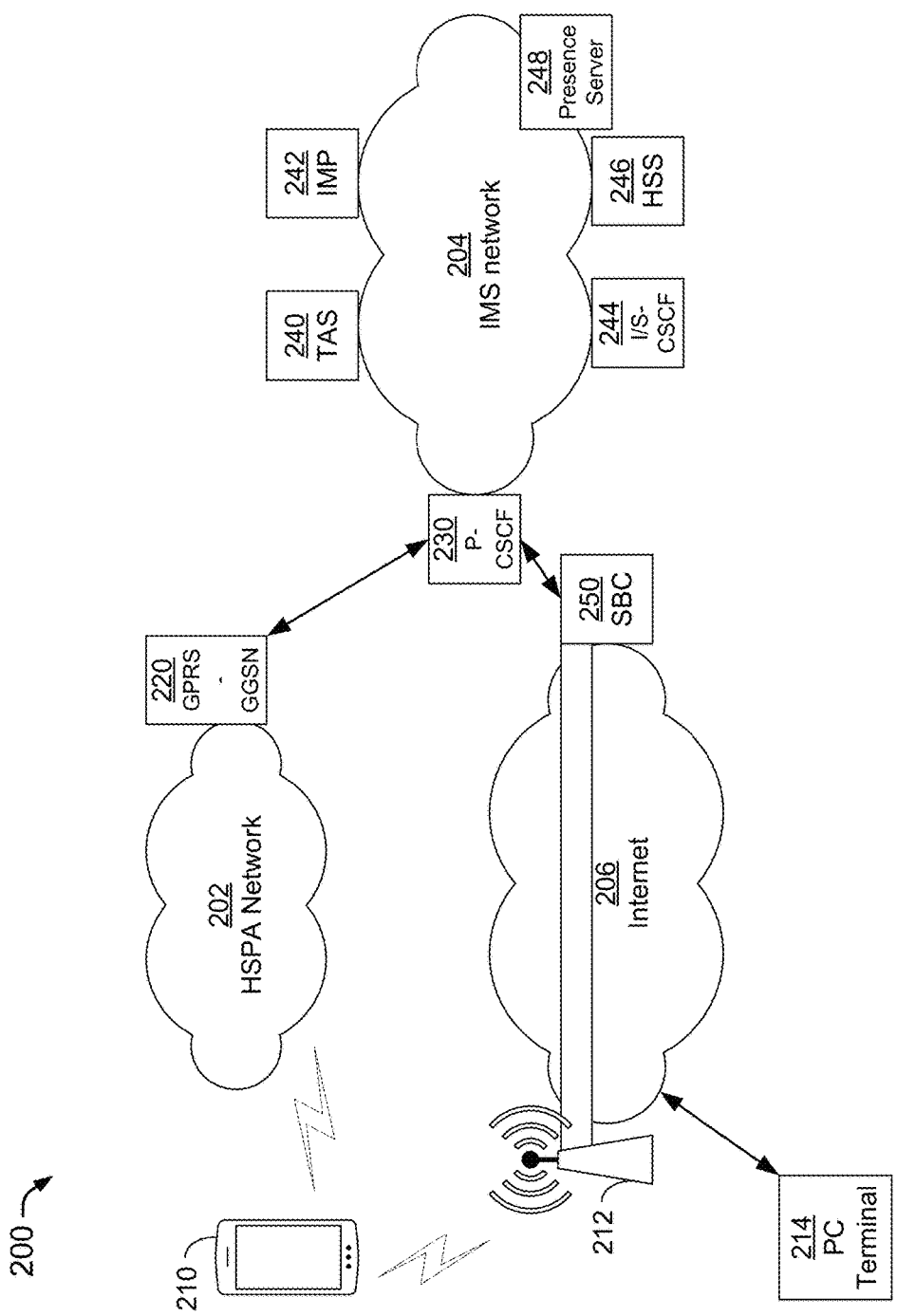
FIG. 2 is a diagram of an example high-level end-to-end architecture for Wi-Fi calling using SIM IMS in accordance with the present disclosure.

Various embodiments of the present disclosure are directed to Wi-Fi calling services using SIP IMS, and may be implemented with example device 190. For example, Wi-Fi calling may be implemented using SIP-IMS handsets. Specifically, Wi-Fi layer may be utilized as a radio access technology (RAT) for Wi-Fi calling using SIP IMS to access an IMS network. For illustration, a number of representative use cases in various aspects of the present disclosure are provided below. FIG. 2 illustrates an example high-level end-to-end architecture 200 for Wi-Fi calling using SIM IMS in accordance with the present disclosure.

Referring to FIG. 2, example architecture 200 may include an IMS network 204, a high speed packet access (HSPA) network 202 which may include a third generation (3G) mobile telecommunications network, and the Internet 206. IMS network 204 may include one or more telecommunication application servers (TAS) 240, one or more interface message processor (IMP) servers 242, one or more interrogating/serving call session control function (I/S-CSCF) servers 244, one or more home subscriber servers (HSS) 246, one or more presence servers 248, and a proxy CSCF (P-CSCF) server 230. HSPA network 202 may include a gateway general packet radio service (GPRS) support node (GGSN) 220. The Internet 206 may include a Wi-Fi access point 212 as well as a session border controller (SBC) 250, which may be configured to function as an ePDG. Example architecture 200 may also include, for example, a user device 210 (e.g., a smartphone or handset) and a personal computer (PC) terminal 214. User device 210 may be an implementation of example device 190 of FIG. 1 and may be Wi-Fi calling and ePDG capable. User device 210 may be communicatively connected to either or both of HSPA network 202 and the Internet 206. PC terminal 214 may be communicatively connected to the Internet 206. In the example shown in FIG. 2, user device 210 may be connected to HSPA network 202 via cellular RAT. Alternatively or additionally, user device 210 may be connected to the Internet 206 via Wi-Fi access point 212 via Wi-Fi RAT.

Illustrative use cases related to Wi-Fi calling using SIP IMS are described below. In some embodiments, a user of mobile device 210 may make and receive voice calls over a SIP IMS network, e.g., IMS network 204, while connected to Wi-Fi, e.g., via Wi-Fi access point 212. The voice call over Wi-Fi using SIP IMS may drop if the user moves outside a Wi-Fi coverage area. In some embodiments, the user device 210, e.g., a smartphone or a SIP-IMS handset, may register shortly after being on a cellular network, e.g., HSPA network 202, and may be ready to make and receive calls. In some embodiments, when the user moves into the Wi-Fi coverage area while being on an active voice call over a 2G/3G network, the call may continue over the 2G/3G network until the call drops or is terminated by the user. Afterwards, the user device 210 may complete a SIP IMS registration over Wi-Fi. In some embodiments, the user may be able to dial one or more short codes, e.g., 411, 611 and 911, over a SIP IMS network while connected to Wi-Fi.

Illustrative use cases related to messaging over Wi-Fi using SIP IMS are described below. The messaging may be provided by, for example, Short Message Service (SMS) and/or Multimedia Messaging Service (MMS). In some embodiments, a user may use user device 210 to send and receive text messages, e.g., via SMS, over a SIP IMS network, e.g., IMS network 204, while connected to Wi-Fi, e.g., via Wi-Fi access point 212. Additionally or alternatively, the user may use user device 210 to send and receive multimedia messages, e.g., via MMS, over the SIP IMS network while connected to Wi-Fi.

Illustrative use cases related to supplemental services over Wi-Fi using SIP IMS are described below. In some embodiments, a user may enable or disable one or more features, e.g., call forwarding and call waiting options, of user device 210 over a SIP IMS network, e.g., IMS network 204, while connected to Wi-Fi, e.g., via Wi-Fi access point 212. For instance, the user may disable one or more features in a settings menu of user device 210 or through a dialer of the user device 210.

To achieve various embodiments of the present disclosure, a number of requirements need to be met. The following description relates to requirements for user device 210 to enable the user device 210 for Wi-Fi calling over a SIP IMS network, e.g., IMS network 204.

In some embodiments, a Wi-Fi calling-enabled user device, e.g., user device 210, may adhere to protocols and standards pertaining to IMS. In some embodiments, the user device 210 may support a number of Wi-Fi calling and communication modes which determine what bearer each service would use. For instance, the supported modes may include a "Wi-Fi preferred" mode, a "Wi-Fi only" mode, a "cellular preferred" mode and a "cellular network only" mode. The "cellular network only" mode may not be a user-facing feature. This mode may be active simply by turning off the Wi-Fi calling feature.

In some embodiments, the "Wi-Fi preferred" mode may be set as the default mode on the user device 210 for Wi-Fi calling. When the user device 210 is in the "Wi-Fi preferred mode" for Wi-Fi calling, one or more conditions may apply, as described below. In some embodiments, the user device 210 may initiate and complete SIP IMS registration over Wi-Fi when Wi-Fi is available irrespective of availability of the cellular network. In some embodiments, the user device 210 may route some or all voice and messaging traffic, e.g., SMS and/or MMS, over the SIP IMS network. In some embodiments, the user device 210 may route some or all non-IMS data traffic through a native Wi-Fi connection. In some embodiments, if there is no qualified Wi-Fi network available, the user device 210 may use an available cellular network for all services while still monitoring for Wi-Fi. In some embodiments, for a user device, e.g., user device 210, that is ePDG capable and on an active VoLTE call, the user device 210 may attempt handovers on Wi-Fi whenever one or more hand-in conditions are met. In some embodiments, for a user device, e.g., user device 210, that is ePDG capable and on an active Wi-Fi call, the user device 210 may attempt handovers to LTE whenever one or more hand-out conditions are met.

When the user device 210 is in the "Wi-Fi only mode" for Wi-Fi calling, one or more conditions may apply, as described below. In some embodiments, the user device 210 may switch off a cellular radio thereof. In some embodiments, the user device 210 may initiate and complete SIP IMS registration over Wi-Fi when Wi-Fi is available irrespective of availability of a cellular network. In some embodiments, the user device 210 may route some or all voice and messaging traffic, e.g., SMS and/or MMS, over the SIP IMS network. In some embodiments, the user device 210 may route some or all non-IMS data traffic over the SIP IMS network. In some embodiments, if there is no qualified Wi-Fi network available, the user device 210 may not attempt to scan, enable or connect to the cellular network. In some embodiments, for an ePDG capable user device 210 that is on an active VoLTE call, the user device 210 may attempt handovers to Wi-Fi whenever one or more hand-in conditions are met. In some embodiments, for an ePDG capable user device, e.g., user device 210 that is on an active VoLTE call, the user device 210 may remain on Wi-Fi and may not attempt any handover. In some embodiments, the "Wi-Fi only mode" may remain active as long as Wi-Fi calling is enabled for the user device 210. Moreover, if Wi-Fi calling is disabled, logic for the "Wi-Fi only mode" will no longer apply.

When the user device 210 is in the "cellular preferred mode", one or more conditions may apply, as described below. In some embodiments, the user device 210 may use the cellular network for select voice, messaging and/or data communications, and may use Wi-Fi, if available, for other data traffic. In some embodiments, the user device 210 may not attempt to initiate SIP IMS registration over Wi-Fi after successfully connecting to Wi-Fi if a cellular network is available. In some embodiments, in case of no cellular coverage, the user device 210 may initiate and complete SIP IMS registration over Wi-Fi, when available. The registration may remain valid until the user device 210 loses Wi-Fi registration regardless of the status change of the cellular network. In some embodiments, for an ePDG capable user device that is on an active VoLTE call, e.g., user device 210, the user device 210 may remain on LTE regardless of Wi-Fi coverage. In some embodiments, for an ePDG capable user device that is on an active Wi-Fi call, e.g., user device 210, the user device 210 may attempt handovers to LTE whenever one or more hand-out conditions are met.

When the user device 210 is in the "cellular network only mode", the user device 210 may behave as if there is no Wi-Fi calling supported. One or more conditions may apply, as described below. In some embodiments, the user device 210 may use the cellular network for select voice, messaging and/or data communications, and use Wi-Fi, if available, for other data traffic. In some embodiments, the user device 210 may not attempt to initiate SIP IMS registration over Wi-Fi after successfully connecting to Wi-Fi. In some embodiments, in case of no cellular coverage, the user device 210 may not attempt to initiate SIP IMS registration over Wi-Fi.

According to the present disclosure there are SIP IMS registration requirements for a user device, e.g., user device 210, when registering using Wi-Fi, as described below. In some embodiments, once the user device 210 has obtained a valid IP and DNS address via DHCP or is using static IP settings, the user device 210 may attempt registration with an IMS network. For example, the user device 210 may attempt registration if a correct SIM card is used and the user device 210 is not in Airplane mode. In some embodiments, when registration failures occur, the user device 210 may display one or more associated error codes. The error code(s) may continue to be displayed as long as the error condition persists. In some embodiments, when registered on a SIP IMS network, the user device 210 may de-register from the SIP IMS network when one or more of the following conditions are met: (1) the user device 210 is powered off; (2) the user of the user device 210 chooses to disconnect from the current active Wi-Fi; and (3) the user disables Wi-Fi calling. In some embodiments, in case the user device 210 loses IMS registration while maintaining good Wi-Fi connectivity, the user device may fall back to cellular coverage, if available, when the current profile is set to "cellular preferred" mode or "Wi-Fi preferred" mode. Alternatively, the user device 210 may retry IMS registration if the connection preference is set to "Wi-Fi preferred" mode or "Wi-Fi only" mode. In some embodiments, the user device 210 may register to a SIP IMS network when a valid SIM card is used. If other SIM cards are used the user device 210 may not initiate IMS registration and may display one or more appropriate error messages.

According to the present disclosure there are mobility requirements for a user device, as described below. In some embodiments, the user device, e.g., user device 210, may rove-in when a threshold Wi-Fi received signal strength indication (RSSI) level, e.g., −75 dBm, is met. This threshold may be a rove-in threshold used to determine whether the user device 210 should attempt IMS registration when associated to a Wi-Fi network. The rove-in threshold may be applied when the user device 210 is in idle mode and may be independent of the device connection preference. In some embodiments, while registered on SIP IMS and idle, the user device 210 may monitor the Wi-Fi RSSI levels. If the Wi-Fi signal level falls below a preset threshold, e.g., −85 dBm, the user device 210 may begin a rove-out process. In some embodiments, in the case where SIM lock is enabled, the user device 210 may be able to stay on the cellular network following rove-out without prompting the user to enter a PIN code. In some embodiments, if the user device 210 does not support handover capability (e.g., no ePDG logic) and is on an active Wi-Fi call, and if the Wi-Fi RSSI is nearing the threshold for rove-out (e.g., −85 dBm), the user device 210 may generate an audible notification (e.g., a two-tone beep) alerting the user that the user device 210 is leaving the Wi-Fi coverage and that call might drop. The audible notification may be accompanied by an on-screen message. The wording of the on-screen message may be provided by a service provider. In some embodiments, when the user device 210 is on an active VoLTE call and enters the coverage of a Wi-Fi network the information (e.g., SSID and password) of which is saved in the user device 210, the user device 210 may handin to Wi-Fi if the user device 210 is in "Wi-Fi preferred" mode or "Wi-Fi only" mode. If the user device 210 is in "cellular preferred" mode, the user device 210 may not attempt to handin to Wi-Fi. Alternatively, the user device 210 may handin to Wi-Fi if the user device 210 is observing a Wi-Fi RSSI that meets the hand-in threshold, e.g., −75 dBm. In some embodiments, when the user device 210 is on an active Wi-Fi call, the user device 210 may evaluate the Wi-Fi link and cellular conditions to determine, via a preset algorithm, if and when to hand the call over to VoLTE. This may occur when the user device 210 is in "Wi-Fi preferred" mode or "cellular preferred" mode. If the user device 210 in "Wi-Fi only" mode then it may not attempt any handover to cellular. In some embodiments, the handset manufacturer of the user device 210 may implement a handover algorithm to decide whether to handout from Wi-Fi to cellular. The handover algorithm may consider a number of factors in deciding whether or not to initiate hand-out from Wi-Fi to cellular, including: Wi-Fi packet retransmissions and loss on downlink and uplink, Wi-Fi RSSI value, and availability of a cellular network and signal strength.

According to the present disclosure there are calling features and SMS/MMS requirements for a user device, as described below. In some embodiments, when an emergency call is invoked and the user device, e.g., user device 210, is registered through GERAN/UTRAN, the user device 210 may apply normal 911-call procedures. When an emergency call is invoked and the user device 210 is registered on a SIP IMS network over Wi-Fi, a number of requirements for the user device 210 may apply, as described below.

Figure 3:
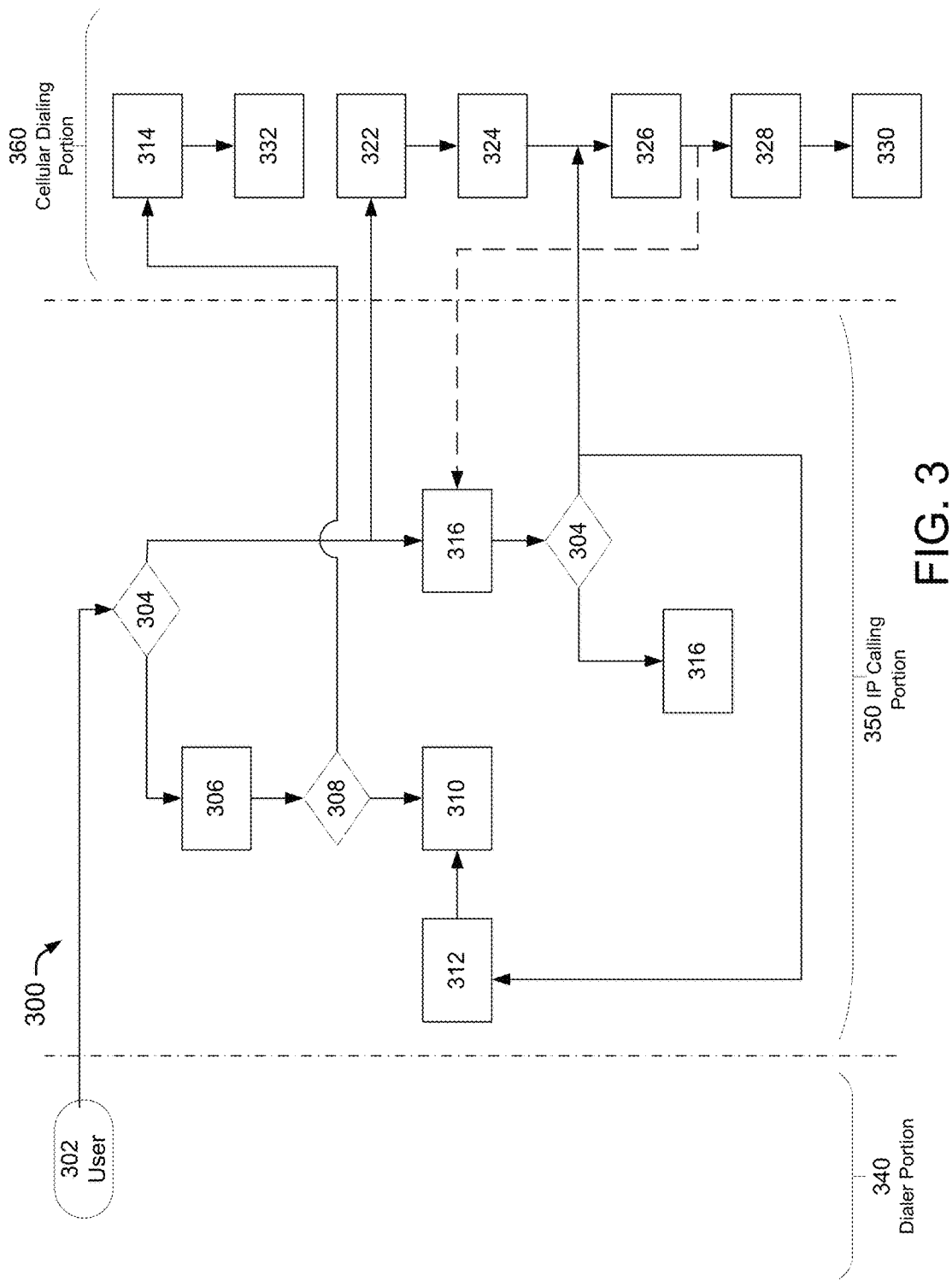
FIG. 3 is a flow diagram of an example process for a user device to make an emergency call in accordance with the present disclosure.

FIG. 3 illustrates an example process 300 for a user device to make an emergency call in accordance with the present disclosure. The user device in the example shown in FIG. 3 may be example device 190 and/or user device 210 as described above. It is noteworthy that more than one operation/task of example process 300 may occur in parallel in that operations/tasks of example process 300 do not necessarily occur in series. Referring to FIG. 3, example process 300 may take place at some or all of a dialer portion 340, an IP calling portion 350 and a cellular calling portion 360 of a user device, e.g., example device 190 or user device 210. At 302 a user of the user device dials "911" for an emergency call. At 304, the user device determines whether Wi-Fi calling on an IMS network is available or whether cellular calling (indicated as circuit switch, or "CS") is available. If Wi-Fi calling on an IMS network is available, the decision process 300 flows to the left side, otherwise the decision process 300 flows to the right. With Wi-Fi calling available, at 306 the user device dials 911 to initiate the emergency call. At 308, the user device determines whether to re-direct the call to CS or if an error occurs. If the user device determines that the call needs to be re-directed to CS or if an error occurs, at 314 the user device dials 911 to initiate an emergency call over a cellular network at 332. Otherwise, at 310 the user device dials 911 to initiate the emergency call over a Wi-Fi network. If the user device decides to make the emergency call over a cellular network (e.g., due to unavailability of Wi-Fi), at 316 the user device awaits for cellular connectivity. At 318 the user device determines whether the waiting is timed out when searching for cellular coverage. If the waiting for cellular connectivity is timed out, example process 300 proceeds to 312 where the user device dials 911 by Wi-Fi calling. Further, if the user device decides to make the emergency call over a cellular network, at 322 the user device dials 911 and at 324 the user device turns on its cellular radio. At 326 the cellular radio of the user device is turned on and searches for cellular coverage. Depending on how soon cellular coverage is discovered, the searching at 318 may or may not time out. After cellular coverage is discovered, at 328 the user device starts the 911 call to initiate an emergency call over a cellular network at 330.

In some embodiments, the user device may comply with a predetermined set of emergency procedures in identifying emergency calls. In some embodiments, when registered on IMS for Wi-Fi calling, the user device may route an emergency call on cellular or IMS depending on the preference set by the network during registration. This may apply regardless of the connection preference selected. In some embodiments, the user device may receive an emergency call preference from the network at registration in an "emergency call preference" mode Inn some embodiments, when the emergency call preference is set to cellular, the user device may check for cellular coverage. If any cellular coverage is found, the user device may de-register from the IMS domain and revert back to cellular and place the 911 call. The user device may remain on cellular for a duration of time specified by a guard timer to allow for potential PSAP call back.

Once the guard timer expires, the user device may re-register on IMS if one or more Wi-Fi conditions are met, as described below. In some embodiments, if no cellular network is available for placing the emergency call, the user device may complete the call on the IMS network. In some embodiments, regardless of whether the emergency call is placed over cellular or Wi-Fi, the emergency call setup time may not exceed a predetermined duration of time, e.g., 10 seconds. In some embodiments, when the emergency call preference is set to Wi-Fi, the user device may complete the call directly on the IMS network. In some embodiments, when the emergency call is placed directly over IMS, the call setup time may not exceed a predetermined duration of time, e.g., 10 seconds. In some embodiments, when no emergency call preference is set by the network, the user device may complete the call on the cellular network, and this may be the default behavior.

In some embodiments, the user device may attempt to find its location whenever it registers to IMS over Wi-Fi for voice services. The user device may include the last seen P-LANI along with a timestamp of when it was last observed and a timestamp of the registration when the user device is trying to register on Wi-Fi. In some embodiments, the user device may save the acquired location for the entire duration of the session. In some embodiments, the user device may attempt to acquire a new location if Wi-Fi access changes, e.g., new access point with the same SSID. In some embodiments, the user device may support a list of N11 calling as supported on 2G/3G devices such as, for example, 611 calling, 411 calling and 911 calling. In some embodiments, the user device may support message waiting indicator (MWI). In some embodiments, the user device may support SMS when on Wi-Fi calling.

According to the present disclosure there are various error codes occurred during different connectivity phases, as described below.

Table 1 below shows call drop error codes supported in various embodiments of the present disclosure.

TABLE 1

| Example Error Code | Example Error Text | Error Description |
|---|---|---|
| CD-01 | Wi-Fi signal lost | The user device is on call while registered to SIP IMS network and suddenly loses Wi-Fi coverage causing the call drop. |
| CD-11 | Wi-Fi signal lost | ePDG Wi-Fi calling—The user device is on call while registered to SIP IMS network and suddenly loses Wi-Fi coverage, causing the call drop or the user device loses Wi-Fi before it is able to complete the handover. |
| CD-02 | ISP Problem | The user device is on call while registered to SIP IMS network and experience loss of packet while observing good Wi-Fi signal (an indication of Internet/ISP issues causing the call to drop). |
| CD-021 | ISP Problem | ePDG Wi-Fi calling—The user device is on call while registered to SIP IMS network and experiences loss of packet while observing good Wi-Fi signal (an indication of internet/ISP issues causing the call to drop). |
| CD-03 | Unable to complete Call | ePDG Wi-Fi calling—The user device is on VoLTE call and enters Wi-Fi coverage but is unable to successfully complete the handover to Wi-Fi. |
| CD-04 | No Available qualified mobile network | ePDG Wi-Fi calling—The user device is on Wi-Fi call but is unable to find a qualified LTE network to handout causing the call to drop. |
| CD-05 | Unable to complete Call | ePDG Wi-Fi calling—The user device is on Wi-Fi call but fails to handout to LTE because of network error. |
| CD-06 | Unable to complete Call | ePDG Wi-Fi calling—The user device is on Wi-Fi call but fails to handout to LTE for any reason other than network rejection. |

Table 2 below shows error codes that may be displayed by the user device when the user device encounters errors corresponding to those shown in Table 1.

TABLE 2

| Example Error Code | Example Error Cause | Example Displayed Message |
|---|---|---|
| ER02 | Unable to receive response to NAPTR query | ER02—DNS Error |
| ER03 | Unable to receive response to SRV query | ER03—DNS Error |
| ER04 | Unable to receive response to A query | ER04—DNS Error |
| ER041 | ePDG Wi-Fi calling—Device is unable to resolve FQDN for the ePDG to an IP Address | ER041—DNS Error |
| ER05 | Incorrect SIM card used (ex: no UICC with GBA support being used) The error will be displayed when the SIM card inserted is not GBA capable or is not a TMO SIM card | ER05—Invalid SIM card |
| ER07 | Error shown when the device experiences a Null pointer Exception error or an error local to the device before registration attempts are made | ER07—Unable to connect |
| ER081 | Device is not able to connect to ePDG or experiences a Null pointer error or an error local to the device before registration attempts are made | ER081—Unable to connect |
| ER082 | Device is unable to establish an IP sec tunnel with the ePDG for any reason other than timeout or certificate validation | ER082—Unable to connect |
| ER08 | Device is unable to establish a TLS connection for reasons other than certificate verifications failures. This includes timeout to TCP connection | ER08—Unable to connect |
| ER010 | Unable to validate the server certificate (this would happen | ER010—Invalid Certificate |

TABLE 2-continued

| Example Error Code | Example Error Cause | Example Displayed Message |
|---|---|---|
| | if the URL for certificate revocation cannot be resolved to IP or the server cannot be reached in case of a firewall or captive portal) | |
| ER101 | Unable to validate the server certificate for IP sec tunnel establishment | ER101—Invalid Certificate |
| ER011 | The certificate is invalid: certificate is revoked, certificate expired, | ER011—Invalid Certificate |
| ER111 | The certificate during IP sec tunnel establishment is invalid: certificate is revoked or has expired | ER111—Invalid Certificate |
| REG90x (as returned by the network) | Network returns 403 Forbidden to the Register message Reason code will be sent by the network, the device will simply display the code returned by the network. <Format to be specified> Error 403: Unknown user Network will send: "REG901: unable to connect" This will happen in case of SIM card doesn't exist (e.g. already deleted) from HLR/HSS Error 403: Roaming not allowed Network will send: "REG902: unable to connect" Non-TMO SIM in the phone (long term scenario, currently handset won't try register without T-MO SIM) For future use, if MVNO were not allowed on our IMS network Error 403: Mismatch identities Network will send "REG903: Unable to Connect" IMPI and IMPU do not match OTA to the SIM did not happen MSISDN changed—change in HSS will be needed Error 403: authentication scheme unsupported Network will send "REG904: Unable to Connect" Error would happen if username and password used instead of SIM based authentication Unlikely scenario, but potentially happen with tablets Error 403: handset is blacklisted Network will send: "REG905: Unable to Connect" Based on EEIR check, handset is blacklisted | Display text as received from network |
| REG91 | Error 500: Internal server error Device receives a 500 error message in response to the register message | REG91—Unable to Connect |
| REG09 | No 911 address on file Error should be displayed if the device receives a Notify Terminate or a 403 to the subscribe message Device should retry to register 3 times then stop any further registration attempts if the same error is encountered. The device should re-attempt register if: The device loses current Wi-Fi association and re-associates with Wi-Fi Wi-Fi calling is disabled then re-enabled | REG09—Missing 911 Address |
| REG99 | All other failures | REG99—Unable to Connect |

In view of FIG. 1-FIG. 3 and description above, there are various user experience requirements, as described below. In some embodiments, when Wi-Fi is enabled for the very first time, the user device may provide a popup to the user to inform the user of the Wi-Fi calling capabilities of the user device. The text of the displayed message may be provided by the service provider. If Wi-Fi is enabled by default, the popup may be displayed upon the first Wi-Fi connection. In some embodiments, the first-time popup may include buttons including, but not limited to, a "skip" button to allow the user to go back to the previous screen and a "learn more" button to take the user to a first screen of a tutorial. In some embodiments, when the user device successfully completes SIP/IMS registration, a Wi-Fi calling icon may be displayed on the left side of the status bar. A cellular signal meter may be changed to zero, may have a symbol over the top, or may disappear entirely. For ePDG capable user devices, Wi-Fi calling icon may be shown upon successful registration but the cellular radio may not be disabled. In some embodiments, the Wi-Fi calling icon may remain in the status bar as long as the registration is valid. If registration is lost, the Wi-Fi calling icon may be removed. In some embodiments, a blue version of the Wi-Fi calling icon or a white version thereof may not be shown if any procedure during the registration process fails. In the event that any error message other than a REG99 error occurs, a red icon may be show on the status bar to indicate the error state of Wi-Fi calling. In some embodiments, when the user device is on a Wi-Fi call, the Wi-Fi calling icon may be changed to an on-call status. In some embodiments, the status of Wi-Fi calling may be part of a notification window. The notification window may have a Wi-Fi calling ready indicator when the user device successfully registers on an IMS network, e.g., a SIP IMS network. In some embodiments, the notification window may show the corresponding error code when an error in registration is encountered. The error may be removed once the registration is successful or when Wi-Fi is disabled. The text of the error message may be provided by the service provider.

In some embodiments, the user device may include a Wi-Fi calling menu to allow the user to control Wi-Fi calling settings. In some embodiments, disabling Wi-Fi calling functionality may change the connection setting of the user device to cellular-only mode. The default setting may be set to having Wi-Fi calling enabled on first boot. Wi-Fi calling status is provided to reflect the current IMS registration status of the user device. In some embodiments, the user device may account for a number of states including, but not limited to: (1) disabled (when Wi-Fi calling is turned off); (2) enabling (when the user device is in the process of registering with a service provider's network for Wi-Fi calling; (3) error code (when a registration error is encountered); (4) poor Wi-Fi signal (when the Wi-Fi RSSI does not meet the rove-in threshold); (5) cellular preferred is your connection preference (when the cellular preferred connection preference is selected and cellular network is available); (6) ready for calls (when the user device is successfully registered with the service provider's network); (7) not connected to Wi-Fi (when Wi-Fi calling is turned on and Wi-Fi is on but not connected to a Wi-Fi network); (8) Wi-Fi turned off (when Wi-Fi calling is turned on but Wi-Fi is turned off); and (9) airplane mode is on (when the user device is in airplane mode with Wi-Fi enabled). In some embodiments, the following options may be provided for Wi-Fi calling. A first option is connection preferences, which offers the option to change the connection mode over Wi-Fi. There may be several modes available such as, for example, Wi-Fi preferred, Wi-Fi only, and cellular preferred. Each mode may have a brief user-friendly explanation, and the text to be displayed may be provided by the service provider. A second option is help. This may include a tutorial for Wi-Fi calling.

According to the present disclosure, the user device may clearly label calls made when on Wi-Fi or calls that may be made on Wi-Fi through a series of popup, toast, and drop-down messages. In some embodiments, when Wi-Fi calling is active and registered, a call button in the dialer of the user device may be changed from a standard call button to a Wi-Fi calling icon. In some embodiments, when Wi-Fi calling is active and registered and the user enters the dialer, a marquee message may appear at the top of the screen for a period of time, e.g., 5 seconds, to indicate, for example, "Calls will be made over Wi-Fi." In some embodiments, when Wi-Fi calling is not active and there is no cellular coverage the user device may display a popup message if the user goes to the dialer and tries to make a call. When the user presses the send button the user may receive a popup that reads, for example, "No cellular network available; connect to available Wi-Fi to make calls." In some embodiments, when Wi-Fi calling is not active and there is no cellular coverage the user device may display a popup message if the user goes to a messaging app and tries to send a message via SMS or MMS. When the user presses the send button the user may receive a popup that reads, for example, "No cellular network available; connect to available Wi-Fi for messaging." In some embodiments, when Wi-Fi calling is not active and there is no cellular coverage the user device may display a drop down message if the user goes to the dialer and tries to make a call. The drop down message may read, for example, "Connect to Wi-Fi to make calls." In some embodiments, when Wi-Fi calling is not active and there is no cellular coverage the user device may display a drop down message if the user goes to the messaging app and tries to send a message. The drop down message may read, for example, "Connect to Wi-Fi for Messaging."

In some embodiments, the user device may maintain a minimum mean opinion score (MOS) score, e.g., 3.2, in an open air environment with no Bluetooth. In some embodiments, the user device may maintain a minimum MOS score, e.g., 3.2, in an open air environment while paired and connected to a Bluetooth headset. In some embodiments, engineering screens may allow the option to manually enter the IP address and/or fully qualified domain name (FQDN) for the session border controller (SB)/ePDG and allow to disable the DNS lookup mechanism if needed. In some embodiments, engineering screens may provide the ability to enable/disable transport layer security (TLS) encryption or enable/disable null encryption for ePDG capable devices. In some embodiments, engineering screens may provide the ability to enable SIP messages for log capturing and trouble-shooting. In some embodiments, engineering screens may allow configuration of digest accounts, e.g., username and password, for authentication.

Wi-Fi statistics may be provided or otherwise utilized for better understanding of the basic performance and utilization of the services outlined above which may not be available presently. Wi-Fi calling metrics may be collected for analysis and may include metrics such as, for example, successful registration, de-registration, unsuccessful registration and reason code (error code), call established (may include information on direction of the call), call terminated (may include information on whether the termination was normal or abnormal, and a reason code for the termination if abnormal), and message sent/received (may include information on the type of the message, e.g., SMS or MMS, and the direction of the message). In some embodiments, the user device may broadcast the intent for the parameters described in Table 3 below. The metrics may be broadcast when created.

TABLE 3

| Example Fields | Field Description |
| --- | --- |
| SVC | The originating service, which may be one of the following:<br>REG = Registration<br>Call = Voice Call<br>SMS = SMS<br>MMS = MMS |
| AC | Action, which may be START or END. |
| MSG | Message containing additional information |
| PM | Peer MSISDN, hashed with SHA-256 |
| RSSI | RRSI value in dB |
| TS | Timestamp of the metric (UTC) |
| DIR | Direction of the action (mobile originated or mobile terminated) |
| OK | True means normal, false means abnormal. |
| BYTES IN | The total bytes received as a result of the session (for messaging) |
| BYTES OUT | The total bytes sent as a result of the session (for messaging) |
| BEARER | The bearer for the transaction, which may be Wi-Fi. |

Wi-Fi Calling Using Evolved Packet Data Gateway

Figure 4:
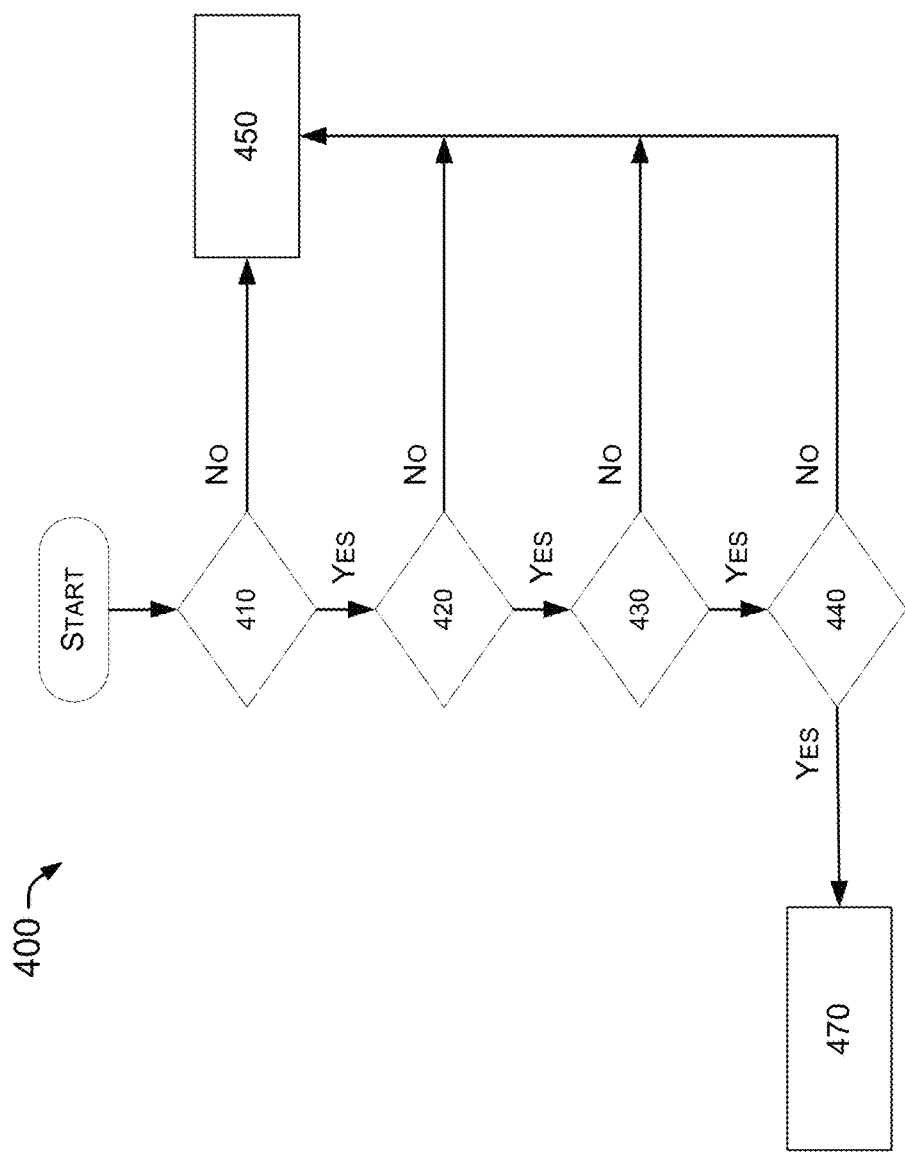
FIG. 4 is a flow diagram of an example decision process for a user device to determine whether to access a visited ePDG or a home ePDG in accordance with the present disclosure.

FIG. 4 illustrates an example decision process 400 for a user device to determine whether to access a visited ePDG or a home ePDG in accordance with the present disclosure. At 410, the user device determines whether any LTE coverage is available. At 420, the user device determines whether data roaming is available. At 430, the user device determines whether a VPLMN is available. At 440, the user device determines whether a DNS query to a VePDG is successful. At 450, the user device connects to the VePDG after it has determined that a determination that LTE coverage is available, that data roaming is available, that a VPLMN is available, and that the DNS query to the VePDG is successful. At 460, the user device connects to a HePDG after it has determined that no LTE coverage is available, that no data roaming is available, that no VPLMN is available, or that the DNS query to the VePDG is unsuccessful.

In some embodiments, the user device may support static IP address and static FQDN for home ePDG. In some embodiments, the user device may support FQDN construction for ePDG selection as per 3GPP TS 23.003.

Regarding tunnel establishment and user authentication, the user device ePDG function may use IKEv2, as specified in RFC 5996, in order to establish IPSec security associations. In some embodiments, the user device ePDG function may follow tunnel full authentication and authorization as defined in 3GPP TS 33.402. In some embodiments, the user device may store a root certificate for a given service provider in a device library for authentication. In some embodiments, the user device may be configured to establish an IPSec tunnel for IMS APN. For example, all IMS associated traffic may be carried through the IMS PDN IPSec tunnel. In some embodiments, the user device may support new IKEv2 attributes allowing IPv4 and/or IPv6 address of the proxy-call session control function (P-CSCF) function to be exchanged. In some embodiments, the user device may support a number of encryption and integrity algorithms for IKEv2 headers and payloads. For example, the user device may support advanced encryption standard (AES), data encryption standard (DES), triple DES, cipher block chaining (CBC) and derivatives thereof for IKE ciphering, IKE integrity, ESP ciphering and ESP integrity. In some embodiments, the user device may support multiple PLMNs in security certificate. For example, the user device may be configured to decode and translate various PLMNs from the network and construct a correct FQDN and authenticate the user device with the corresponding security certificate.

Regarding dead peer detection (DPD), in some embodiments the user device may be configured to respond to DPD IKE_in_Req through IKE_info_Resp. In some embodiments, the user device may be configured to originate keep-alive messages to maintain the validity of an IPSec tunnel.

Regarding re-keying IKE-SA and IPSec-SA, in some embodiments the user device may support IKE-SA re-keying procedures, e.g., to initiate and respond. In some embodiments, the user device may support IPSec-SA re-keying procedures, e.g., to initiate and respond.

Regarding disconnection, in some embodiments the user device may support various disconnection procedures no matter where a request is initiated, e.g., from the user device, ePDG and/or PDN gateway.

Regarding session continuity and handover, in some embodiments the user device may be configured to enable session continuity from LTE to Wi-Fi and from Wi-Fi to LTE. In some embodiments, the user device may ignore any single radio voice call continuity (SRVCC) event from an eNodeB once a hand-in process to Wi-Fi is triggered. For instance, when the user device has established a VoLTE call over LTE, it is possible that the UE will receive the request for SRVCC for the VoLTE call while it is handing the call over to Wi-Fi. In such case, when the user device has triggered the hand-in process (e.g., from LTE to Wi-Fi), the user device may ignore the messages requesting for SRVCC on the LTE side. In some embodiments, when the user device has one IPv4 bearer or flow, a handover request may be for IPv4 support. For instance, when the user device is on LTE and has one IPv4 bearer, a hand-in request to Wi-Fi may be for IPv4 support. When the user device is on Wi-Fi and has one IPv4 flow, a hand-out request to LTE may be for IPv4 support. In some embodiments, when the user device has one IPv6 bearer or flow, a handover request may be for IPv6 support. For instance, when the user device is on LTE and has one IPv6 bearer, a hand-in request to Wi-Fi may be for IPv6 support. When the user device is on Wi-Fi and has one IPv6 flow, a hand-out request to LTE may be for IPv6 support. If there are two IP bearers, e.g., IPv4 and IPv6, the user device may perform two PDN connectivity handover requests for the two IP types. If there is dual stack bearer active, the user device may perform PDN connectivity handover request with IPv4 and IPv6 support.

Regarding IMS services through ePDG, in some embodiments the user device may be configured to discover P-CSCF addresses through the IKEv2 header as per IETF standard.

Regarding voice calls, in some embodiments the user device may be configured to make or receive voice calls through an IMS network with Wi-Fi access only. For instance, the user device may be configured to register to the IMS network and set up and receive voice calls the same way no matter whether any 3GPP RAT is present. In some embodiments, the user device may support seamless transition of voice calls over IMS from LTE to Wi-Fi as well as from Wi-Fi to LTE. In some embodiments, the user device may follow a set of predetermined user interfaces and configuration options requirements. In some embodiments, the user device may comply with a set of predetermined emergency call handling requirements.

Regarding rich communication services (RCS), in some embodiments the user device may be configured to route some or all RCS signals and media traffic through an IMS PDN IPSec tunnel. In some embodiments, the user device may be configured to establish a PDN IPSec tunnel and route all traffic through the PDN IPSec tunnel. In some embodiments, in a home network the user device may use IPv6 for PDN connectivity, and in a visited network the user device may use IPv4 for PDN connectivity.

Regarding IR.94 video calls, in some embodiments, the user device may route IR.94 video calling signals and media traffic through an IMS PDN IPSec tunnel. In some embodiments, the user device may be configured to transfer IR.94 video calls between LTE and Wi-Fi with session continuity. As with handling of voice call continuity, the user device ePDG client may be able to handle IR.94 video calls with session continuity between LTE and Wi-Fi.

Regarding handover criteria, such as RSSI boundary for ePDG function, with "Wi-Fi preferred" or "Wi-Fi only" settings in the user device and Wi-Fi plus LTE coverage being available, the user device may establish and maintain an IMS PDN connectivity on Wi-Fi as long as RSSI is above a predetermined threshold, e.g., −75 dBm. If either Wi-Fi or LTE coverage is available to the user device, the user device may establish and maintain the IMS PDN connectivity on the RAT available as long as the RAT access is maintained despite the coverage signal level. In some embodiments, the predetermined threshold of RSSI level for Wi-Fi rove-in and hand-in is −75 dBm.

Regarding handover decision algorithm, in some embodiments the user device may consider a number of metrics in its handover decision process to maximize the success rate of handover between LTE and Wi-Fi. The metrics considered may include, but not limited to, RSSI, downlink and uplink packet error rate (PER) (e.g., RTP PER), RTCP information, and LTE RSRP and RSRQ information.

Regarding prolonged silence for an ongoing voice session, in an event of no RTP packets being received for a given duration of time, e.g., 5 seconds, the user device may ping the P-CSCF to determine whether the access link is still up and running. In some embodiments, after pinging a server for a predetermine number of times, e.g., 5 times, without receiving any reply from the server, the user device may terminate the call and log it as a drop call. In some embodiments, if the user device received a portion of the ping response, the user device may trigger the handover procedure and attempt to hand the call to another RAT.

The present disclosure also describes requirements for traffic management implementation in a user device through the connectivity with an ePDG to ensure interoperability with a service provider's network as well as to define new services and tunneling mechanism, illustrative examples of which are depicted in FIG. 5-FIG. 12 as described below.

Figure 5:
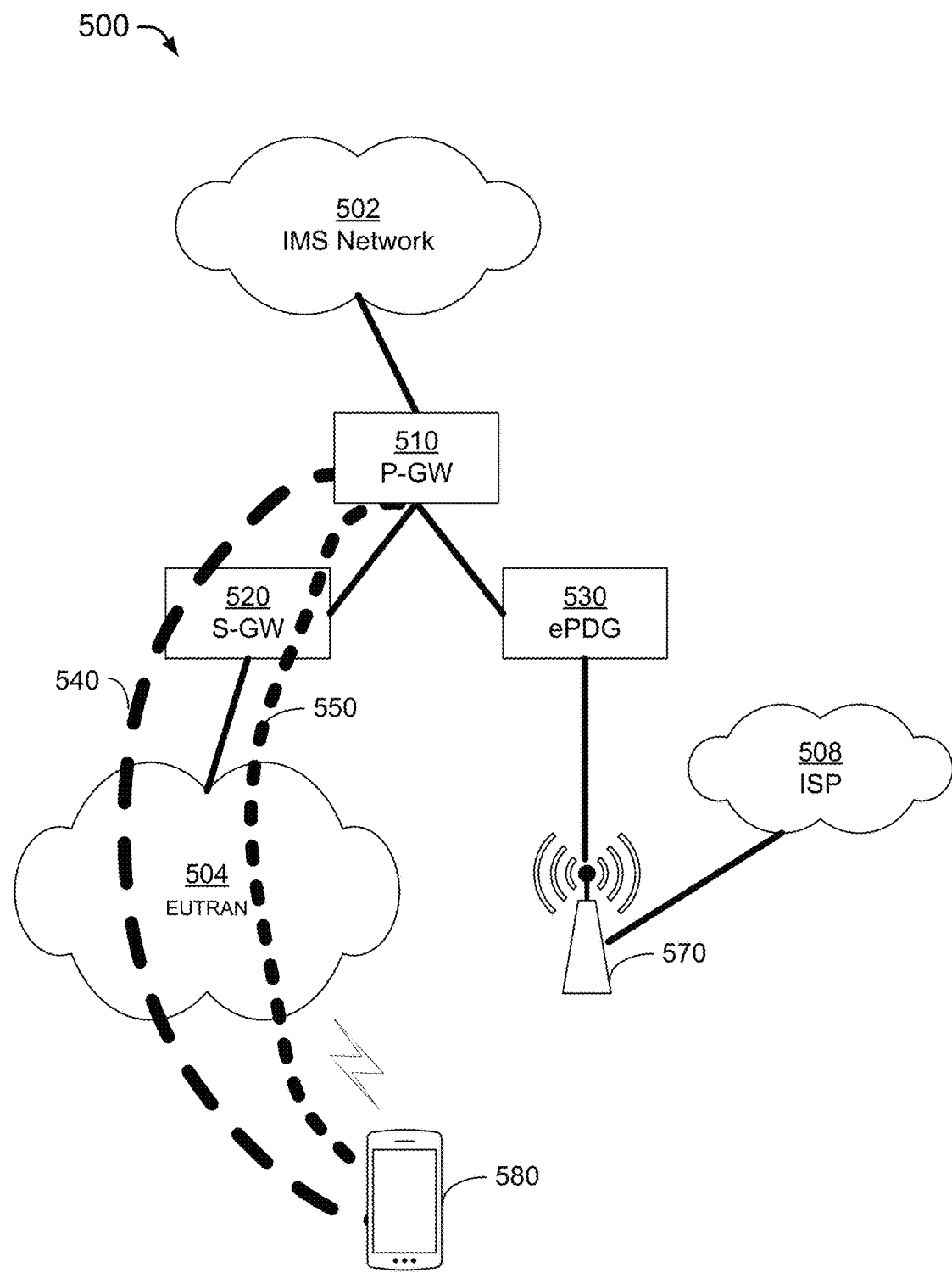
FIG. 5 is a diagram of example scenarios of tunnel mechanisms in accordance with the present disclosure.

FIG. 5 illustrates example scenarios 500 of tunnel mechanisms for a VoLTE user device in accordance with the present disclosure. Example scenario 500 includes an IMS network 502, a P-GW 510, a serving gateway (S-GW) 520, an ePDG 530, an Evolved Universal Terrestrial Radio Access Network (EUTRAN) 504, an Internet service provider (ISP) network 508, a Wi-Fi access point 570, and a user device 580. User device 580 may be an implementation of example device 190 or user device 210. Referring to FIG. 5, in example scenario 500 there is LTE coverage but no Wi-Fi coverage. First traffic 550 including MMS, XML Configuration Access Protocol (XCAP), visual voicemail, over-the-air (OTA) and OTT traffic between user device 580 and P-GW 510 may be routed through EUTRAN 504 and S-GW 520. SIP-IMS traffic 540 between user device 580 and P-GW 510 may also be routed through EUTRAN 504 and S-GW 520.

Figure 6:
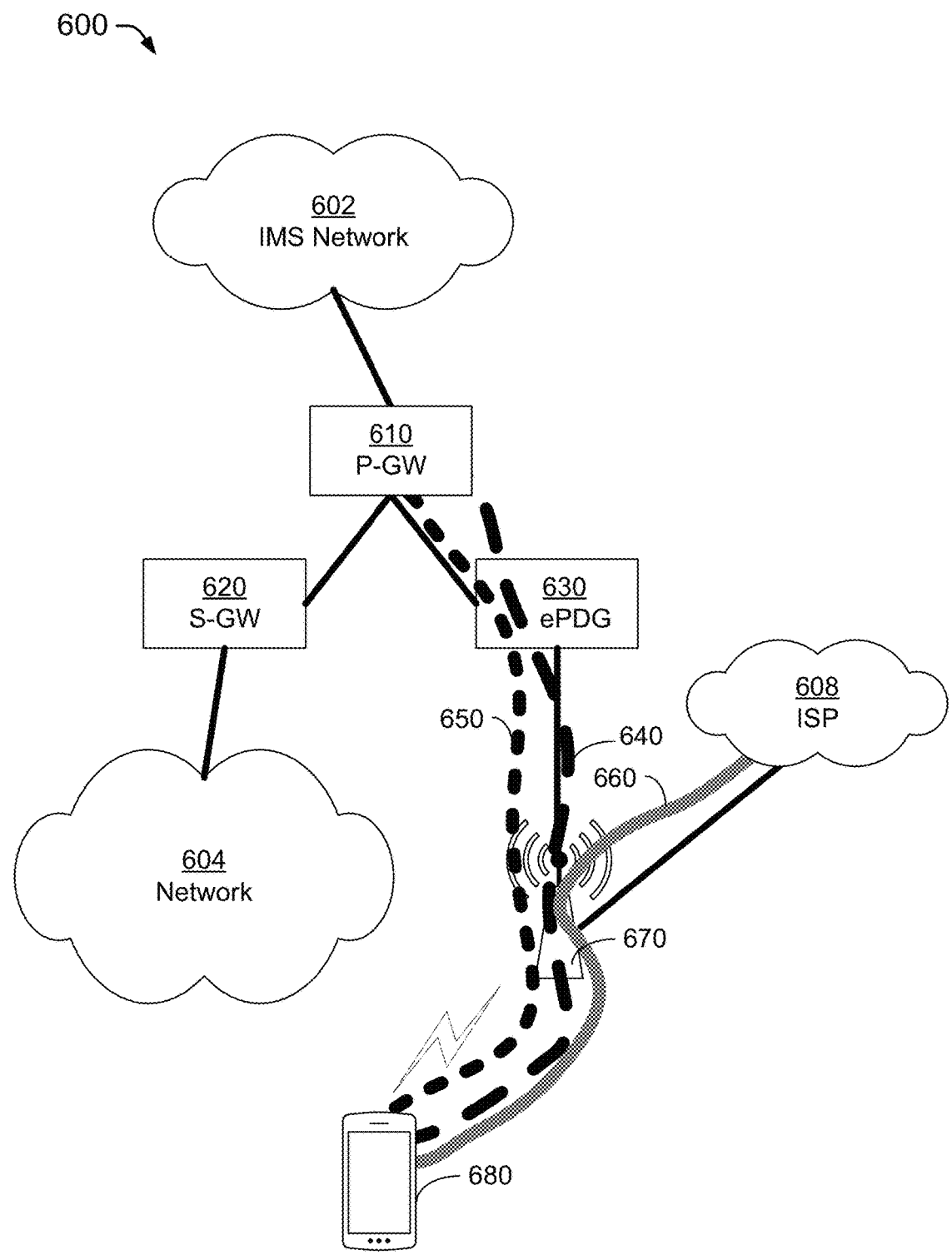
FIG. 6 is a diagram of example scenarios of tunnel mechanisms in accordance with the present disclosure.

FIG. 6 illustrates example scenarios 600 of tunnel mechanisms for a VoLTE user device in accordance with the present disclosure. Example scenario 600 includes an IMS network 602, a P-GW 610, an S-GW 620, an ePDG 630, an network 604 (which may include EUTRAN, Universal Terrestrial Radio Access Network (UTRAN) and/or GSM EDGE radio access network (GERAN)), an ISP network 608, a Wi-Fi access point 670, and a user device 680. User device 680 may be an implementation of example device 190 or user device 210. Referring to FIG. 6, in example scenario 600 there is Wi-Fi coverage but no LTE coverage. First traffic 650 including MMS, XCAP, visual voicemail and OTA between user device 680 and P-GW 610 may be routed from Wi-Fi access point 670 to the P-GW 610 via ePDG 630. Similarly, SIP-IMS traffic 640 between user device 680 and P-GW 610 may also be routed from Wi-Fi access point 670 to P-GW 610 via ePDG 630. OTT traffic 660 may be routed to ISP network 608 via Wi-Fi access point 670.

Figure 7:
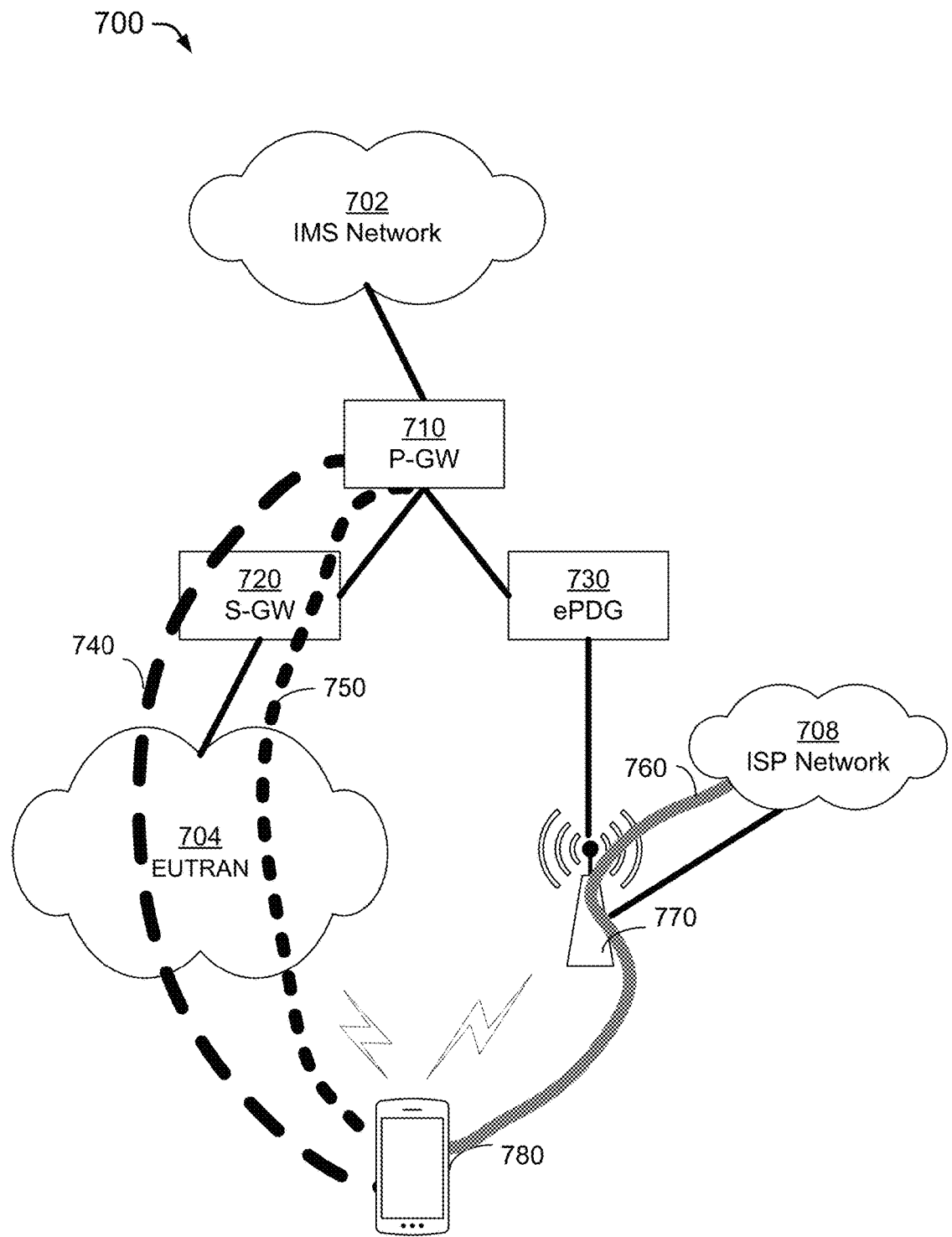
FIG. 7 is a diagram of example scenarios of tunnel mechanisms in accordance with the present disclosure.

FIG. 7 illustrates example scenarios 700 of tunnel mechanisms for a VoLTE user device in accordance with the present disclosure. Example scenario 700 includes an IMS network 702, a P-GW 710, an S-GW 720, an ePDG 730, a EUTRAN 704, an ISP network 708, a Wi-Fi access point 770, and a user device 780. User device 780 may be an implementation of example device 190 or user device 210. Referring to FIG. 7, in example scenario 700 both LTE coverage and Wi-Fi coverage are available and user device 780 is in the "cellular preferred" mode. First traffic 750 including MMS, XCAP, visual voicemail and OTA between user device 780 and P-GW 710 may be routed through EUTRAN 704 and S-GW 720. Similarly, SIP-IMS traffic 740 between user device 780 and P-GW 710 may also be routed through EUTRAN 704 and S-GW 720. OTT traffic 760 may be routed to ISP network 708 via Wi-Fi access point 770.

Figure 8:
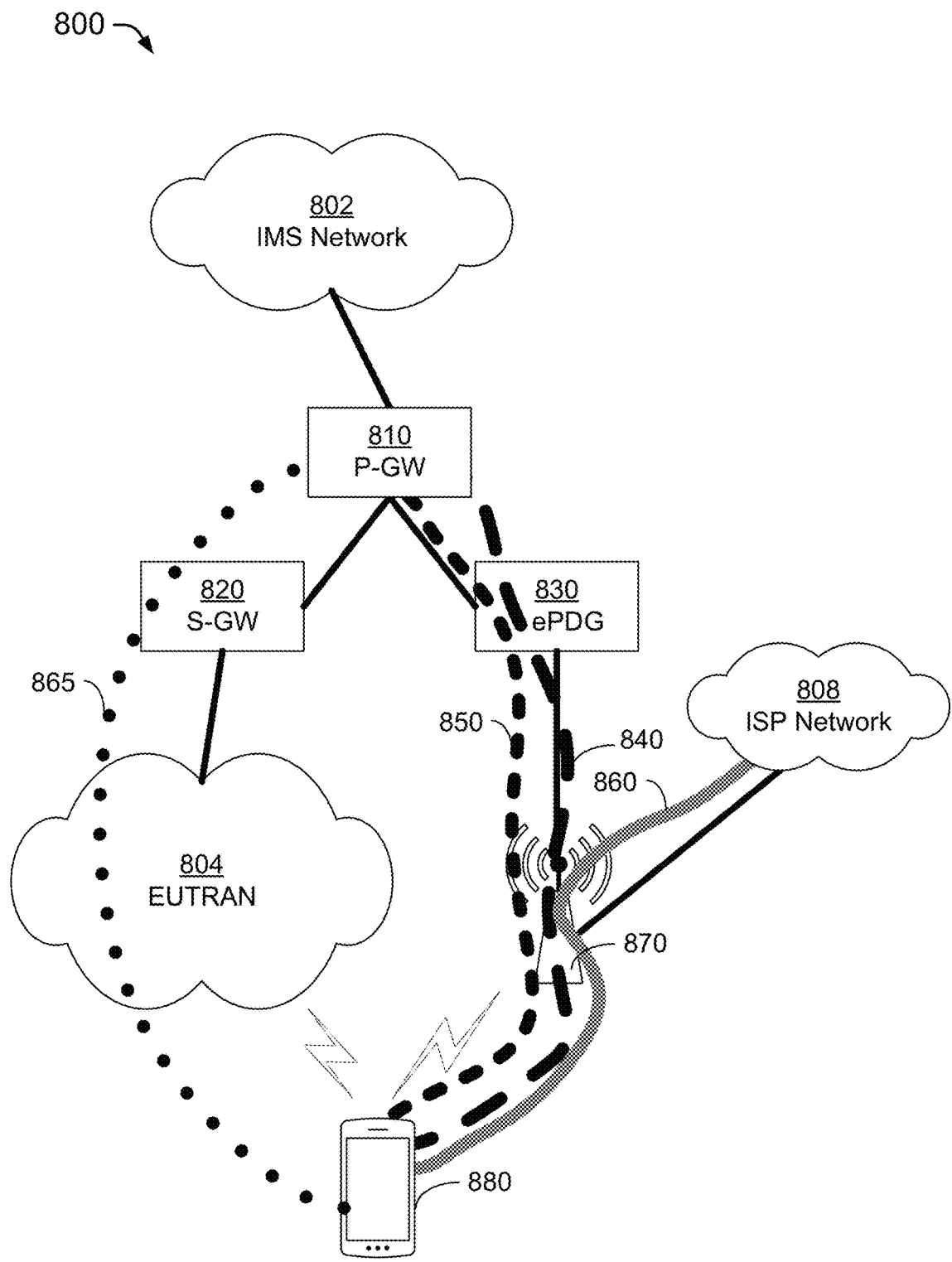
FIG. 8 is a diagram of example scenarios of tunnel mechanisms in accordance with the present disclosure.

FIG. 8 illustrates example scenarios 800 of tunnel mechanisms for a VoLTE user device in accordance with the present disclosure. Example scenario 800 includes an IMS network 802, a P-GW 810, an S-GW 820, an ePDG 830, a EUTRAN 804, an ISP network 808, a Wi-Fi access point 870, and a user device 880. User device 880 may be an implementation of example device 190 or user device 210. Referring to FIG. 8, in example scenario 800 both LTE coverage and Wi-Fi coverage are available and user device 880 is in the "Wi-Fi preferred" mode. First traffic 850 including MMS, XCAP, visual voicemail and OTA between user device 880 and P-GW 810 may be routed from Wi-Fi access point 870 to the P-GW 810 via ePDG 830. Similarly, SIP-IMS traffic 840 between user device 880 and P-GW 810 may also be routed from Wi-Fi access point 870 to P-GW 810 via ePDG 830. OTT traffic 860 may be routed to ISP network 808 via Wi-Fi access point 870. Additionally, keep alive traffic 865 may between user device 880 and P-GW 810 may be routed through EUTRAN 804 and S-GW 820.

Figure 9:
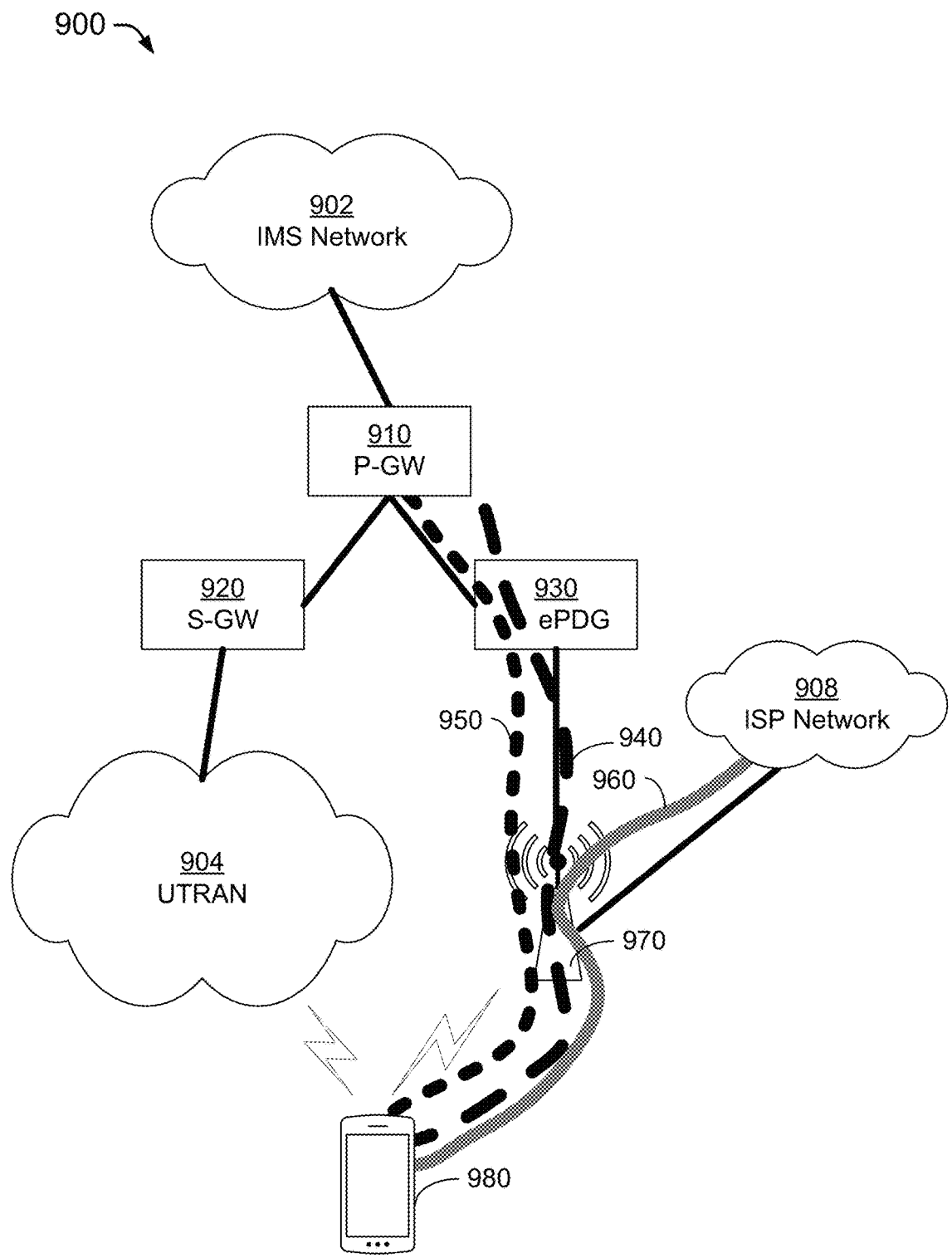
FIG. 9 is a diagram of example scenarios of tunnel mechanisms in accordance with the present disclosure.

FIG. 9 illustrates example scenarios 900 of tunnel mechanisms for a VoLTE user device in accordance with the present disclosure. Example scenario 900 includes an IMS network 902, a P-GW 910, an S-GW 920, an ePDG 930, an UTRAN 904, an ISP network 908, a Wi-Fi access point 970, and a user device 980. User device 980 may be an implementation of example device 190 or user device 210. Referring to FIG. 9, in example scenario 900 UTRAN coverage and Wi-Fi coverage are available. First traffic 950 including MMS, XCAP, visual voicemail and OTA between user device 980 and P-GW 910 may be routed from Wi-Fi access point 970 to the P-GW 910 via ePDG 930. Similarly, SIP-IMS traffic 940 between user device 980 and P-GW 910 may also be routed from Wi-Fi access point 970 to P-GW 910 via ePDG 930. OTT traffic 960 may be routed to ISP network 908 via Wi-Fi access point 970. Wireless communication between user device 980 and UTRAN 904 may be established but idle and attached, so long as UTRAN coverage is present.

Figure 10:
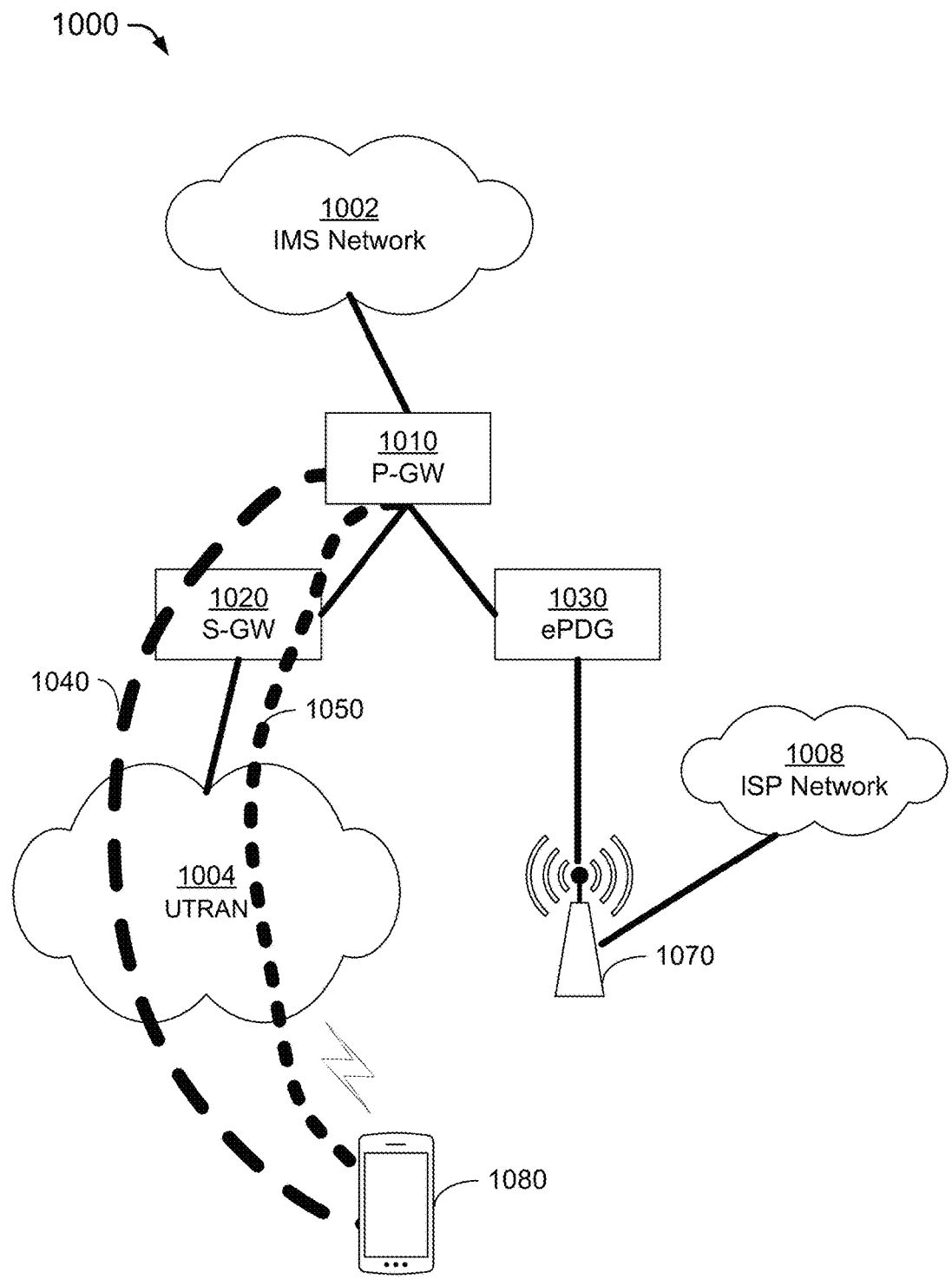
FIG. 10 is a diagram of another example scenario of tunnel mechanisms in accordance with the present disclosure.

FIG. 10 illustrates example scenarios 1000 of tunnel mechanisms for a VoLTE user device in accordance with the present disclosure. Example scenario 1000 includes an IMS network 1002, a P-GW 1010, an S-GW 1020, an ePDG 1030, an UTRAN 1004, an ISP network 1008, a Wi-Fi access point 1070, and a user device 1080. User device 1080 may be an implementation of example device 190 or user device 210. Referring to FIG. 10, in example scenario 1000 UTRAN coverage is available but Wi-Fi coverage is not available (or Wi-Fi is not turned on at user device 1080). First traffic 1050 including MMS, XCAP, visual voicemail, OTA and OTT between user device 1080 and P-GW 1010 may be routed through UTRAN 1004 and S-GW 1020. Similarly, SIP-IMS traffic 1040 between user device 1080 and P-GW 1010 may also be routed through UTRAN 1004 and S-GW 1020. Voice calls may be made through UTRAN 1004.

Figure 11:
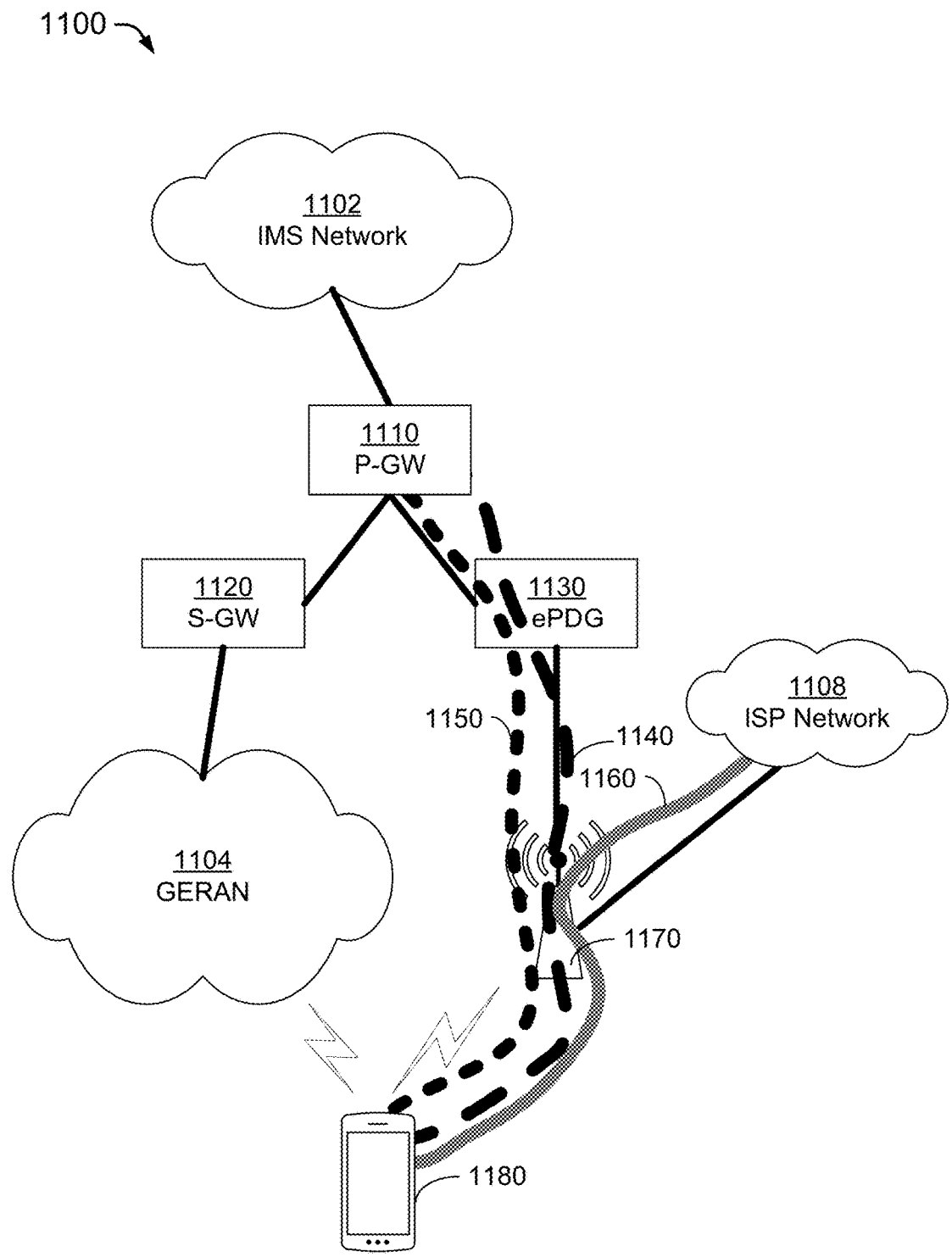
FIG. 11 is a diagram of yet another example scenario of tunnel mechanisms in accordance with the present disclosure.

FIG. 11 illustrates example scenarios 1100 of tunnel mechanisms for a VoLTE user device in accordance with the present disclosure. Example scenario 1100 includes an IMS network 1102, a P-GW 1110, an S-GW 1120, an ePDG 1130, a GERAN 1104, an ISP network 1108, a Wi-Fi access point 1170, and a user device 980. User device 1180 may be an implementation of example device 190 or user device 210. Referring to FIG. 11, in example scenario 1100 both GERAN coverage and Wi-Fi coverage are available. First traffic 1150 including MMS, XCAP, visual voicemail and OTA between user device 1180 and P-GW 1110 may be routed from Wi-Fi access point 1170 to P-GW 1110 via ePDG 1130. Similarly, SIP-IMS traffic 1140 between user device 1180 and P-GW 1110 may also be routed from Wi-Fi access point 1170 to P-GW 1110 via ePDG 1130. OTT traffic 1160 may be routed to ISP network 1108 via Wi-Fi access point 1170. Wireless communication between user device 1180 and GERAN 904 may be established but idle and attached, so long as GERAN coverage is present.

Figure 12:
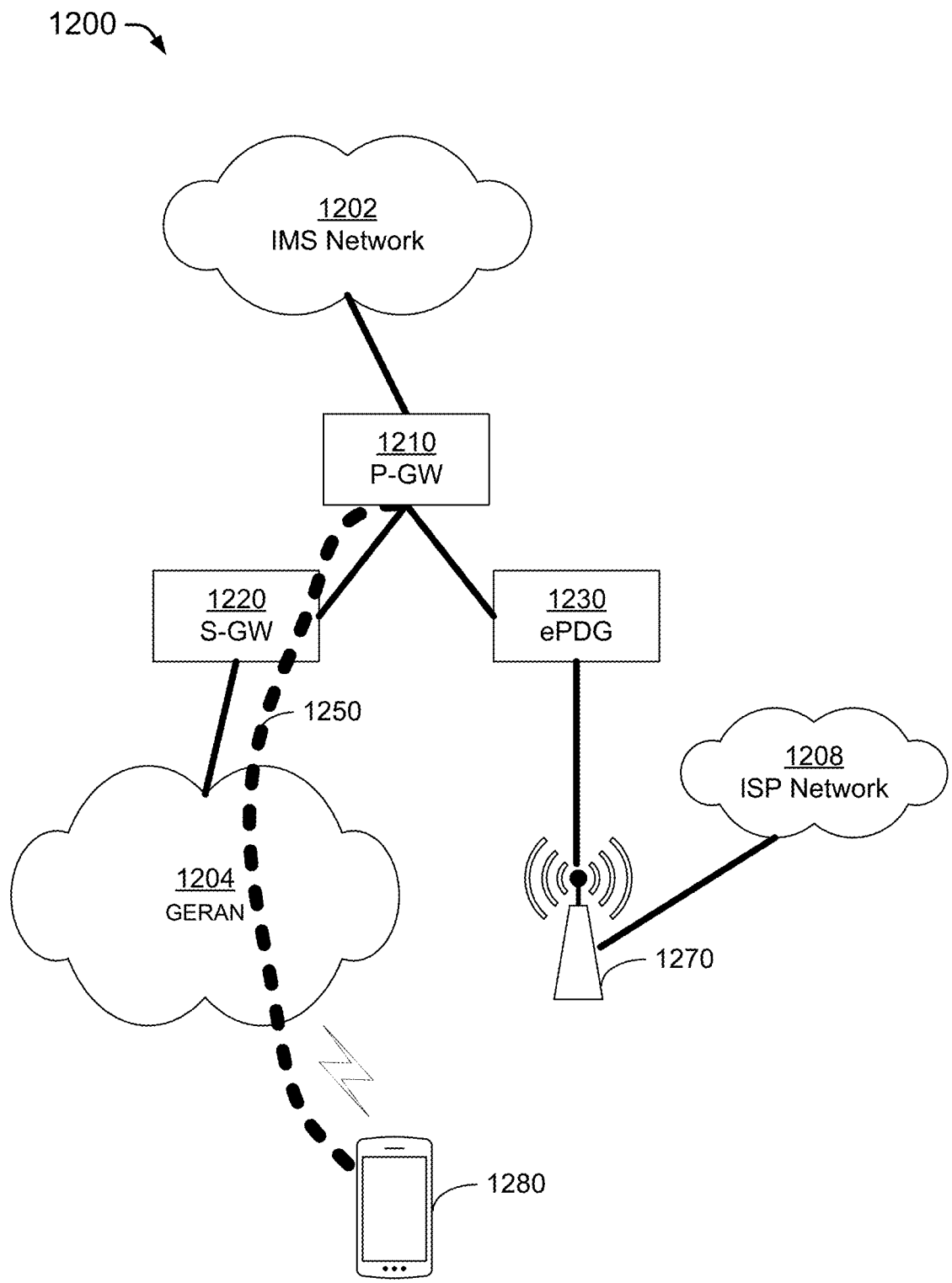
FIG. 12 is a diagram of still another example scenario of tunnel mechanisms in accordance with the present disclosure.

FIG. 12 illustrates example scenarios 1200 of tunnel mechanisms for a VoLTE user device in accordance with the present disclosure. Example scenario 1200 includes an IMS network 1202, a P-GW 1210, an S-GW 1220, an ePDG 1230, a GERAN 1204, an ISP network 1208, a Wi-Fi access point 1270, and a user device 1280. User device 1280 may be an implementation of example device 190 or user device 210. Referring to FIG. 12, in example scenario 1200 GERAN coverage is available but Wi-Fi coverage is not available (or Wi-Fi is not turned on at user device 1280). First traffic 1250 including MMS, XCAP, visual voicemail, OTA and OTT between user device 1280 and P-GW 1210 may be routed through GERAN 1204 and S-GW 1220. Voice calls and messaging may be made through GERAN 1204.

Deployment of ePDG is to provide a 3GPP-standarized gateway for untrusted non-3GPP access, e.g., Wi-Fi, to access a service provider's evolved packet core (EPC). The present disclosure focuses on the session management on voice, messaging and video traffic over IP services. For illustrative purpose and not limiting the scope of the present disclosure, a list of example use cases with respect to a user device are described below. The example use cases may be realized by applications built on top of ePDG tunnels and connectivity engine. The "user device" in the following description may refer to example device 190, user device 210, user device 580, user device 680, user device 780, user device 880, user device 980, user device 1080, user device 1180 and/or user device 1280 as described above. Moreover, the "user device" in the following description may be configured to implement embodiments pertaining to FIG. 1-FIG. 12.

In one example use case, the Wi-Fi radio of a user device is turned off, and Wi-Fi calling is either enabled or disabled but not in "Wi-Fi only" mode. Additionally, video calling is disabled, and the user device is connected to a radio access network (RAN). A user of the user device may use the user device to make mobile originated (MO) and/or mobile terminated (MT) voice calls as well as messaging, e.g., SMS and/or MMS, over RAN. The user may also use the user device to perform data browsing and/or data streaming activities over RAN.

In one example use case, the Wi-Fi radio of a user device is turned off, and Wi-Fi calling is either enabled or disabled but not in "Wi-Fi only" mode. Additionally, video calling is enabled, and the user device is connected to RAN. A user of the user device may use the user device to make MO/MT voice calls as well as messaging, e.g., SMS and/or MMS, over RAN. The user may also use the user device to perform data browsing and/or data streaming activities over RAN. The user may further use the user device to make MO/MT video calls over RAN.

In one example use case, the Wi-Fi radio of a user device is turned on but not connected, and Wi-Fi calling is either enabled or disabled but not in "Wi-Fi only" mode. Additionally, video calling is disabled, and the user device is connected to RAN. A user of the user device may use the user device to make MO/MT voice calls as well as messaging, e.g., SMS and/or MMS, over RAN. The user may also use the user device to perform data browsing and/or data streaming activities over RAN.

In one example use case, the Wi-Fi radio of a user device is turned on but not connected, and Wi-Fi calling is either enabled or disabled but not in "Wi-Fi only" mode. Additionally, video calling is enabled, and the user device is connected to RAN. A user of the user device may use the user device to make MO/MT voice calls as well as messaging, e.g., SMS and/or MMS, over RAN. The user may also use the user device to perform data browsing and/or data streaming activities over RAN. The user may further use the user device to make MO/MT video calls over RAN.

In one example use case, the Wi-Fi radio of a user device is turned on and connected, and Wi-Fi calling is disabled. Additionally, video calling is disabled, and the user device is connected to RAN. A user of the user device may use the user device to make MO/MT voice calls as well as messaging, e.g., SMS and/or MMS, over RAN. The user may also use the user device to perform data browsing and/or data streaming activities over Wi-Fi.

In one example use case, the Wi-Fi radio of a user device is turned on and connected, and Wi-Fi calling is disabled. Additionally, video calling is enabled, and the user device is connected to a non-LTE RAN. A user of the user device may use the user device to make MO/MT voice calls as well as messaging, e.g., SMS and/or MMS, over the RAN. The user may also use the user device to perform data browsing and/or data streaming activities over RAN. The user may further use the user device to make MO/MT video calls over Wi-Fi.

In one example use case, the Wi-Fi radio of a user device is turned on and connected, and Wi-Fi calling is enabled (in "Wi-Fi preferred" mode or "Wi-Fi only" mode) and connected. Additionally, video calling is disabled, and the user device is disconnected from RAN, as baseband radio may be off as Wi-Fi calling is active. A user of the user device may use the user device to make MO/MT voice calls as well as messaging, e.g., SMS and/or MMS, using Wi-Fi calling over ePDG. The user may also use the user device to perform data browsing and/or data streaming activities over Wi-Fi.

In one example use case, the Wi-Fi radio of a user device is turned on and connected, and Wi-Fi calling is enabled (in "Wi-Fi preferred" mode or "Wi-Fi only" mode) and connected. Additionally, video calling is enabled, and the user device is disconnected from RAN, as baseband radio may be off as Wi-Fi calling is active. A user of the user device may use the user device to make MO/MT voice calls as well as messaging, e.g., SMS and/or MMS, using Wi-Fi calling over ePDG. The user may also use the user device to perform data browsing and/or data streaming activities over Wi-Fi. The user may further use the user device to make MO/MT video calls over Wi-Fi.

In an example ePDG handover use case for hand-out to 3GPP radio access technology (RAT), a user device may initiate a hand-out request if a number of criteria are met. The Wi-Fi calling preference needs to be set to either "Wi-Fi preferred" or "cellular preferred". Any handover criteria from a serving RAT, or the source RAT, to a new RAT, or the target RAT, need to be met. The criteria may be based on RAT signal strength (e.g., RSSI/RSRP0, signal quality (e.g., downlink PER/RSRQ) and RTCP information for uplink PER information. Moreover, a RAN network is a home public land mobile network (PLMN).

In some embodiments, a user device may not initiate a handover if the Wi-Fi calling preference is set to "Wi-Fi only" mode.

In some embodiments, a network may initiate a handover when the user device is on Wi-Fi calling, and the uplink packet loss is detected to be over a predetermined threshold.

In some embodiments, if the target RAN for handover is not a roaming network of a particular service provider, the user device may not initiate a handover request.

In some embodiments, a service provider's network may not initiate any handover request and may reject any hand-out request coming from a user device with target RAN as roaming mobile country code (MCC) and mobile network code (MNC).

In one example use case, the Wi-Fi radio of a user device is turned on and connected, and Wi-Fi calling is enabled (in "Wi-Fi preferred" mode) and connected. Additionally, video calling is disabled, and the user device is disconnected from RAN, as baseband radio may be off as Wi-Fi calling is active. A user of the user device may use the user device to make a voice call over ePDG and then move out of Wi-Fi coverage, seamlessly continuing the call over RAN. After leaving Wi-Fi coverage, the user may resume all other browsing activities over RAN and the transition may not be seamless.

In one example use case, the Wi-Fi radio of a user device is turned on and connected, and Wi-Fi calling is enabled (in "Wi-Fi preferred" mode) and connected. Additionally, video calling is enabled and connected, and the user device is disconnected from RAN, as baseband radio may be off as Wi-Fi calling is active. A user of the user device may use the user device to make a voice call over ePDG and then move out of Wi-Fi coverage, seamlessly continuing the call over RAN. The user may use the user device to be on a video call over Wi-Fi and then move out of Wi-Fi coverage, seamlessly continuing the call over RAN. After leaving Wi-Fi coverage, the user may resume all other browsing activities over RAN and the transition may not be seamless.

In one example use case, the Wi-Fi radio of a user device is turned on and connected, and Wi-Fi calling is enabled (in "Wi-Fi only" mode) and connected. Additionally, video calling is enabled and connected, and the user device is disconnected from RAN, as baseband radio may be off as Wi-Fi calling is active and may remain off as "Wi-Fi only" mode is selected. A user of the user device may use the user device to make a voice call over ePDG and then move out of Wi-Fi coverage, dropping the call as a result. The user may use the user device to be on a video call over Wi-Fi and then move out of Wi-Fi coverage, dropping the call as a result. After leaving Wi-Fi coverage, the user may be unable to perform any browsing activities.

In one example use case, the Wi-Fi radio of a user device is turned on and connected, and Wi-Fi calling is enabled (in "Wi-Fi only" mode) and connected. Additionally, video calling is disabled, and the user device is disconnected from RAN, as baseband radio may be off as Wi-Fi calling is active and may remain off as "Wi-Fi only" mode is selected. A user of the user device may use the user device to make a voice call over ePDG and then move out of Wi-Fi coverage, dropping the call as a result. After leaving Wi-Fi coverage, the user may be unable to perform any browsing activities.

In one example use case, the Wi-Fi radio of a user device is turned on and connected, and Wi-Fi calling is enabled (in "cellular preferred" mode) and not connected. Additionally, video calling is enabled, and the user device is connected to RAN, with Wi-Fi remaining off as cellular coverage is available. A user of the user device may use the user device to make a voice call over RAN and then move out of Wi-Fi coverage with no impact on the call. The user may use the user device to make a video call over Wi-Fi and the move out of Wi-Fi coverage, seamlessly continuing the call over RAN. After leaving Wi-Fi coverage, the user may be able to resume all other browsing activities over RAN and the transition may not be seamless.

In an example ePDG handover use case for hand-in to Wi-Fi, a user device may initiate a hand-in request if a number of criteria are met. The Wi-Fi calling preference needs to be set to "Wi-Fi preferred", and Wi-Fi RSSI is above a predetermined threshold, e.g., −75 dBm. The user device may not initiate the handover if the Wi-Fi calling preference is set to "cellular preferred" mode. If the current RAN is roaming, the user device may not initiate the handover request (which is user configurable) and may continue a call on roaming network until the call drops.

In one example use case, the Wi-Fi radio of a user device is turned on and not connected, and Wi-Fi calling is enabled (in "Wi-Fi preferred" mode) and not connected. Additionally, video calling is disabled, and the user device is connected to RAN. A user of the user device may use the user device to make a voice call over RAN and then move into a saved Wi-Fi coverage, seamlessly continuing the call over Wi-Fi calling over ePDG. After entering the saved Wi-Fi coverage, the user may be able to resume all other browsing activities over Wi-Fi and the transition may not be seamless.

In one example use case, the Wi-Fi radio of a user device is turned on and not connected, and Wi-Fi calling is enabled (in "Wi-Fi preferred" mode) and not connected. Additionally, video calling is enabled and connected, and the user device is connected to RAN. A user of the user device may use the user device to make a voice call over RAN and then move into a saved Wi-Fi coverage, seamlessly continuing the call over Wi-Fi calling over ePDG. The user may use the user device to be on a video call over RAN and the move into a saved Wi-Fi coverage, seamlessly continuing the call over Wi-Fi. After entering the saved Wi-Fi coverage, the user may be able to resume all other browsing activities over Wi-Fi and the transition may be seamless.

In one example use case, the Wi-Fi radio of a user device is turned on and not connected, and Wi-Fi calling is enabled (in "Wi-Fi only" mode) and not connected. Additionally, video calling is enabled and not connected, and the user device is disconnected from RAN, as baseband radio may be off as Wi-Fi calling may be active and may remain off as "Wi-Fi only" mode is selected. A user of the user device may use the user device to make a voice call after entering a saved Wi-Fi coverage or manually connecting to a Wi-Fi network, thus connecting to Wi-Fi calling over ePDG. The user may make a video call once entering a saved Wi-Fi coverage or manually connecting to a Wi-Fi network. The user may perform all other browsing activities once entering a saved Wi-Fi coverage or manually connecting to a Wi-Fi network.

In one example use case, the Wi-Fi radio of a user device is turned on and not connected, and Wi-Fi calling is enabled (in "Wi-Fi only" mode) and not connected. Additionally, video calling is disabled, and the user device is disconnected from RAN, as baseband radio may be off as Wi-Fi calling may be active and may remain off as "Wi-Fi only" mode is selected. A user of the user device may use the user device to make a voice call after entering a saved Wi-Fi coverage or manually connecting to a Wi-Fi network, thus connecting to Wi-Fi calling over ePDG. The user may perform all other browsing activities once entering a saved Wi-Fi coverage or manually connecting to a Wi-Fi network.

In one example use case, the Wi-Fi radio of a user device is turned on and not connected, and Wi-Fi calling is enabled (in "cellular preferred" mode) and not connected. Additionally, video calling is enabled, and the user device is connected to RAN, as Wi-Fi calling may remain off as cellular coverage is available. A user of the user device may use the user device to make a voice call over RAN and then may enter a saved Wi-Fi coverage or manually connect to a Wi-Fi network, the call may continue to stay over RAN as Wi-Fi calling does not register. The user may be on a video call over RAN and then may enter a saved Wi-Fi coverage or manually connect to a Wi-Fi network, seamlessly continuing the call over Wi-Fi. After entering a saved Wi-Fi coverage or manually connecting to a Wi-Fi network, the user may use the user device to resume all other browsing activities over Wi-Fi and the transition may not be seamless.

Description of a number of example parental control use cases for baseline RAN-based parental control is provided below.

In one example use case, the Wi-Fi radio of a user device is off, and Wi-Fi calling is either enabled or disabled. Additionally, video calling is disabled, and the user device is connected to RAN. A user of the user device may use the user device to make MO/MT voice calls, SMS/MMS messaging over RAN, and may not be able to perform certain MO/MT calls and SMS/MMS activities based on destination number, time of day and parental control criteria as specified in a user profile associated with the user device. The user may use the user device to perform data browsing and/or data streaming activities over RAN and may be unable to access certain activities based on time of day, keyword and parental control criteria as specified in the user profile.

In one example use case, the Wi-Fi radio of a user device is off, and Wi-Fi calling is either enabled or disabled. Additionally, video calling is disabled, and the user device is connected to RAN. A user of the user device may use the user device to make MO/MT voice calls, SMS/MMS messaging over RAN, and may not be able to perform certain MO/MT calls and SMS/MMS activities based on destination number, time of day and parental control criteria as specified in a user profile associated with the user device. The user may use the user device to perform data browsing and/or data streaming activities over RAN and may be unable to access certain activities based on time of day, keyword and parental control criteria as specified in the user profile.

In one example use case, the Wi-Fi radio of a user device is off, and Wi-Fi calling is either enabled or disabled but not in the "Wi-Fi only" mode. Additionally, video calling is enabled, and the user device is connected to RAN. A user of the user device may use the user device to make MO/MT voice calls, SMS/MMS messaging over RAN, and may not be able to perform certain MO/MT calls and SMS/MMS activities based on destination number, time of day and parental control criteria as specified in a user profile associated with the user device. The user may use the user device to perform data browsing and/or data streaming activities over RAN and may be unable to access certain activities based on time of day, keyword and parental control criteria as specified in the user profile. The user may also use the user device to make MO/MT video calls over RAN and may be unable to perform certain MO/MT call activities based on destination number, time of day and parental control criteria as specified in the user profile.

In one example use case, the Wi-Fi radio of a user device is on and not connected, and Wi-Fi calling is either enabled or disabled but not in the "Wi-Fi only" mode. Additionally, video calling is disabled, and the user device is connected to RAN. A user of the user device may use the user device to make MO/MT voice calls, SMS/MMS messaging over RAN, and may not be able to perform certain MO/MT calls and SMS/MMS activities based on destination number, time of day and parental control criteria as specified in a user profile associated with the user device. The user may use the user device to perform data browsing and/or data streaming activities over RAN and may be unable to access certain activities based on time of day, keyword and parental control criteria as specified in the user profile.

Description of a number of example parental control use cases for ePDG-based parental control is provided below.

In one example use case, the Wi-Fi radio of a user device is on and connected, and Wi-Fi calling is disabled. Additionally, video calling is enabled, and the user device is connected to RAN. A user of the user device may use the user device to make MO/MT voice calls, SMS/MMS messaging over RAN, and may not be able to perform certain MO/MT calls and SMS/MMS activities based on destination number, time of day and parental control criteria as specified in a user profile associated with the user device. The user may use the user device to perform data browsing and/or data streaming activities over Wi-Fi and may be unable to access certain activities based on time of day, keyword and parental control criteria as specified in the user profile. The user may also use the user device to make MO/MT video calls over Wi-Fi and may be unable to perform certain MO/MT call activities based on destination number, time of day and parental control criteria as specified in the user profile.

In one example use case, the Wi-Fi radio of a user device is on and connected, and Wi-Fi calling is enabled (in "Wi-Fi preferred" mode or "Wi-Fi only" mode) and connected. Additionally, video calling is enabled, and the user device is connected to RAN, as baseband radio may be off as Wi-Fi calling is active. A user of the user device may use the user device to make MO/MT voice calls, SMS/MMS messaging using Wi-Fi calling over ePDG, and may not be able to perform certain MO/MT calls and SMS/MMS activities based on destination number, time of day and parental control criteria as specified in a user profile associated with the user device. The user may use the user device to perform data browsing and/or data streaming activities over Wi-Fi and may be unable to access certain activities based on time of day, keyword and parental control criteria as specified in the user profile. The user may also use the user device to make MO/MT video calls over Wi-Fi and may be unable to perform certain MO/MT call activities based on destination number, time of day and parental control criteria as specified in the user profile.

Regardless of the use case, a number of requirements according to the present disclosure need to be met and are described below.

In terms of connectivity, the user device may maintain an attached state on LTE and put its 3GPP radio on sleep mode while the user device is connected to ePDG through the WiFi radio. In the event that only Wi-Fi coverage exists (e.g., no 3GPP RAT coverage exists) when the user device is switched on, the user device may establish data connectivity through Wi-Fi access as well as voice over Wi-Fi (VoWiFi) connectivity by registering to an IMS network via the IMS APN through an ePDG IPSec tunnel. The user device may place the 3GPP radio into sleep mode and periodically search for 3GPP RAT and PLMN.

Regarding 3GPP radio fallback to 3G or 2G RAT, the 3GPP radio of the user device may attach to an LTE network (but not UMTS or GSM) when IMS PDN connectivity is established on Wi-Fi. In the event that IMS PDN connectivity is established on Wi-Fi and the 3GPP radio falls back from LTE to UMTS or GSM, the 3GPP radio of the user device may detach from the UMTS and GSM RAT. It may stay in sleep mode and scan for LTE coverage. However, if the IMS PDN connectivity is established on LTE (in the "cellular preferred" mode), the fallback mechanism on the 3GPP radio of the user device may remain the same as if the ePDG function does not exist.

Regarding IP connectivity establishment with ePDG, the user device ePDG client may set up secure IPSec tunnels using Internet Key Exchange (IKE) v2 with the ePDG that are compliant to 3GPP TS 24.302. In some embodiments, the user device may be configured to establish and maintain three or more packet data networks (PDN) connections simultaneously. In some embodiments, the user device may be configured to form an IPSec connection to an ePDG over IPv4 and/or IPv6. In some embodiments, the user device may select the first PLMNid stored in the SIM card as the home PLMN reference.

Example Implementations

Figure 13:
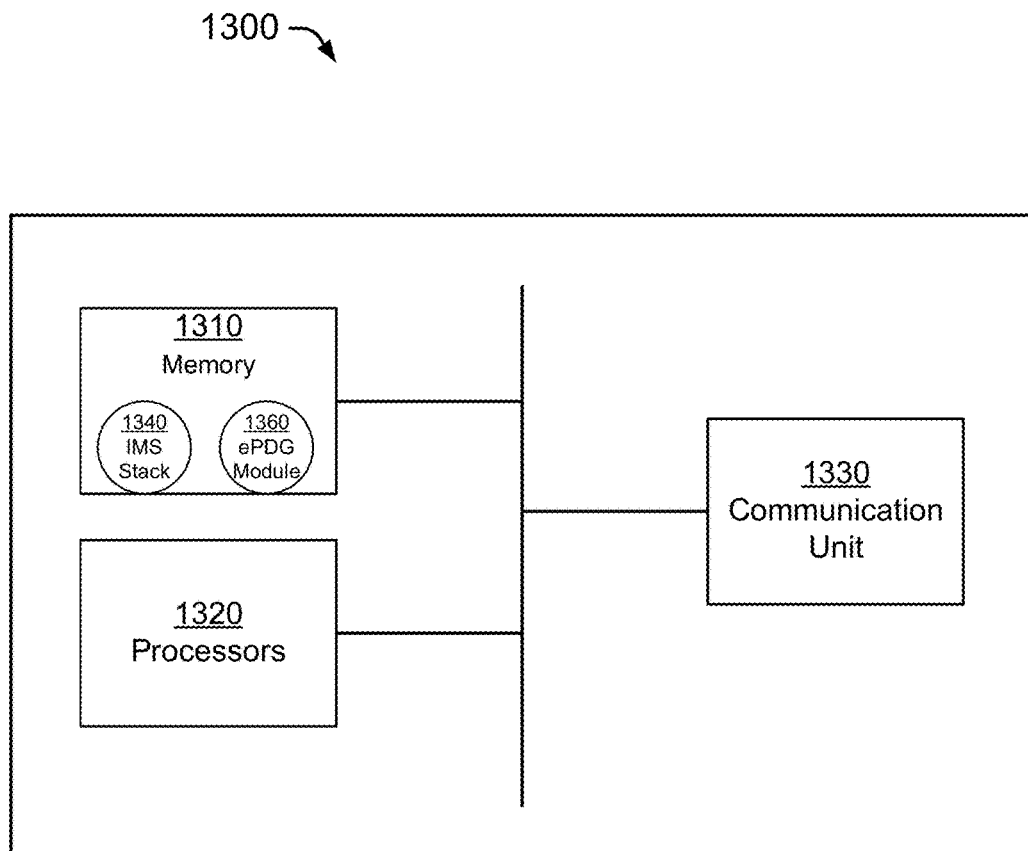
FIG. 13 is a block diagram of an example device configured to implement embodiments of the present disclosure.

FIG. 13 illustrates an example device 1300 configured to implement embodiments of the present disclosure. Example device 1300 may be a user device, user equipment or handset described above, which may be a mobile device such as, for example, a smartphone. Example device 1300 may perform various functions related to techniques, methods and systems described herein, including example process 1400 described below. Example device 1300 may be implemented as example device 190 as described herein and in FIG. 1 and a user device in FIG. 2-FIG. 12. In some embodiments, example device 1300 may include at least those components shown in FIG. 13, such as a memory 1310, one or more processors 1320 and a communication unit 1330. Although memory 1310, one or more processors 1320 and communication unit 1330 are illustrated as discrete components separate from each other, in various embodiments of example device 1300 some or all of memory 1310, one or more processors 1320 and communication unit 1330 may be integral parts of a single integrated circuit (IC), chip or chipset. In some embodiments, communication unit 1330 may be an integral part of one or more processors 1320, although they are shown as discrete components separate from each other in FIG. 13. For simplicity, description of one or more processors 1320 below is provided as if there is a single processor 1320.

Memory 1310 may be configured to store data and one or more sets of processor-executable instructions. In the example shown in FIG. 13, memory 1310 may store therein an IMS stack 1340 and an ePDG module 1360 capable of ePDG functions with connection management. IMS stack 1340 may be similar to IMS stack 120 of example device 190, and ePDG module 1360 may be similar to ePDG module 122 of example device 190. For instance, ePDG module 1360 may include one or more processor-executable instructions that, upon execution by processor 1320, allow processor 1320 to perform operations in accordance with FIG. 1-FIG. 12 and FIG. 14 of the present disclosure. Communication unit 1330 may be configured to receive and transmit wireless signals in compliance with various standards and protocols listed in the present disclosure to effect Wi-Fi calling using SIM IMS and ePDG. Processor 1320 may be coupled to memory 1310 and configured to access memory 1310 to execute the one or more sets of processor-executable instructions, e.g., ePDG module 1360, to perform operations described below.

In some embodiments, processor 1320 may determine whether to connect to a first ePDG, e.g., a visited ePDG (VePDG), or a second ePDG, e.g., a home ePDG (HePDG,) by performing operations including: determining whether any LTE coverage is available; determining whether data roaming is available; determining whether a visited public land mobile network (VPLMN) is available; determining whether a DNS query to the first ePDG is successful; connecting to the first ePDG responsive to a determination that LTE coverage is available, a determination that data roaming is available, a determination that a VPLMN is available, and a determination that the DNS query to the first ePDG is successful; and connecting to the second ePDG responsive to a determination that no LTE coverage is available, a determination that no data roaming is available, a determination that no VPLMN is available, or a determination that the DNS query to the first ePDG is unsuccessful.

In some embodiments, processor 1320 may, responsive to a determination that no LTE coverage is available, connect to a Wi-Fi access point. In some embodiments, processor 1320 may register to an IMS network. In some embodiments, processor 1320 may establish data connectivity through the Wi-Fi access point. In some embodiments, processor 1320 may establish voice over Wi-Fi (VoWiFi) connectivity through the Wi-Fi access point.

In some embodiments, processor 1320 may be configured to further perform one or more operations including: placing a 3rd Generation Partnership Project (3GPP) radio of the mobile device in a sleep mode; periodically searching for a 3GPP RAT and a PLMN; enabling voice calls through the IMS network through the Wi-Fi access point; enabling an IMS PDN IPSec tunnel; routing RCS signals and media traffic through the IMS PDN IPSec tunnel; routing video calling signals and media traffic through the IMS PDN IPSec tunnel; and initiating handover between LTE and Wi-Fi by considering one or more metrics. The metrics may include, for example, a RSSI level, downlink and uplink packet error rates, Real-time Transport Protocol (RTP) Control Protocol (RTCP) information, and LTE reference signal received power (RSRP) and reference signal received quality (RSRQ) information.

In some embodiments, in an event that IMS PDN connectivity is established on Wi-Fi and a 3GPP radio of the mobile device falls back from LTE to a Universal Mobile Telecommunications System (UMTS) or Global System for Mobile Communications (GSM) radio RAT, processor 1320 may detach the 3GPP radio from the UMTS or GSM RAT, place the 3GPP radio in a sleep mode, and scan for a LTE coverage.

In some embodiments, in enabling of the voice calls through the IMS network processor 1320 may be configured to provide a seamless transition of a voice call over the IMS network from LTE to Wi-Fi and from Wi-Fi to LTE. In some embodiments, in enabling the IMS PDN IPSec tunnel processor 1320 may be configured to maintain the IMS PDN IPSec tunnel on Wi-Fi when a RSSI level of Wi-Fi signals is above a threshold value, e.g., −75 dBm. In some embodiments, in routing the video calling signals through the IMS PDN IPSec tunnel processor 1320 may be configured to provide a seamless transition of a video call through the IMS PDN IPSec tunnel from LTE to Wi-Fi and from Wi-Fi to LTE In some embodiments, in establishing the IPSec tunnel processor 1320 may be configured to perform one or more of operations including: establishing and maintaining three or more PDN connections simultaneously; establishing the IPSec tunnel based on IPv4 and IPv6; selecting a first PLMN of a plurality of PLMNs as a home PLMN, identifications of the plurality of PLMNs stored in the mobile device; and supporting one or more static IP addresses and one or more FQDNs for the second ePDG responsive to connecting to the second ePDG.

Figure 14:
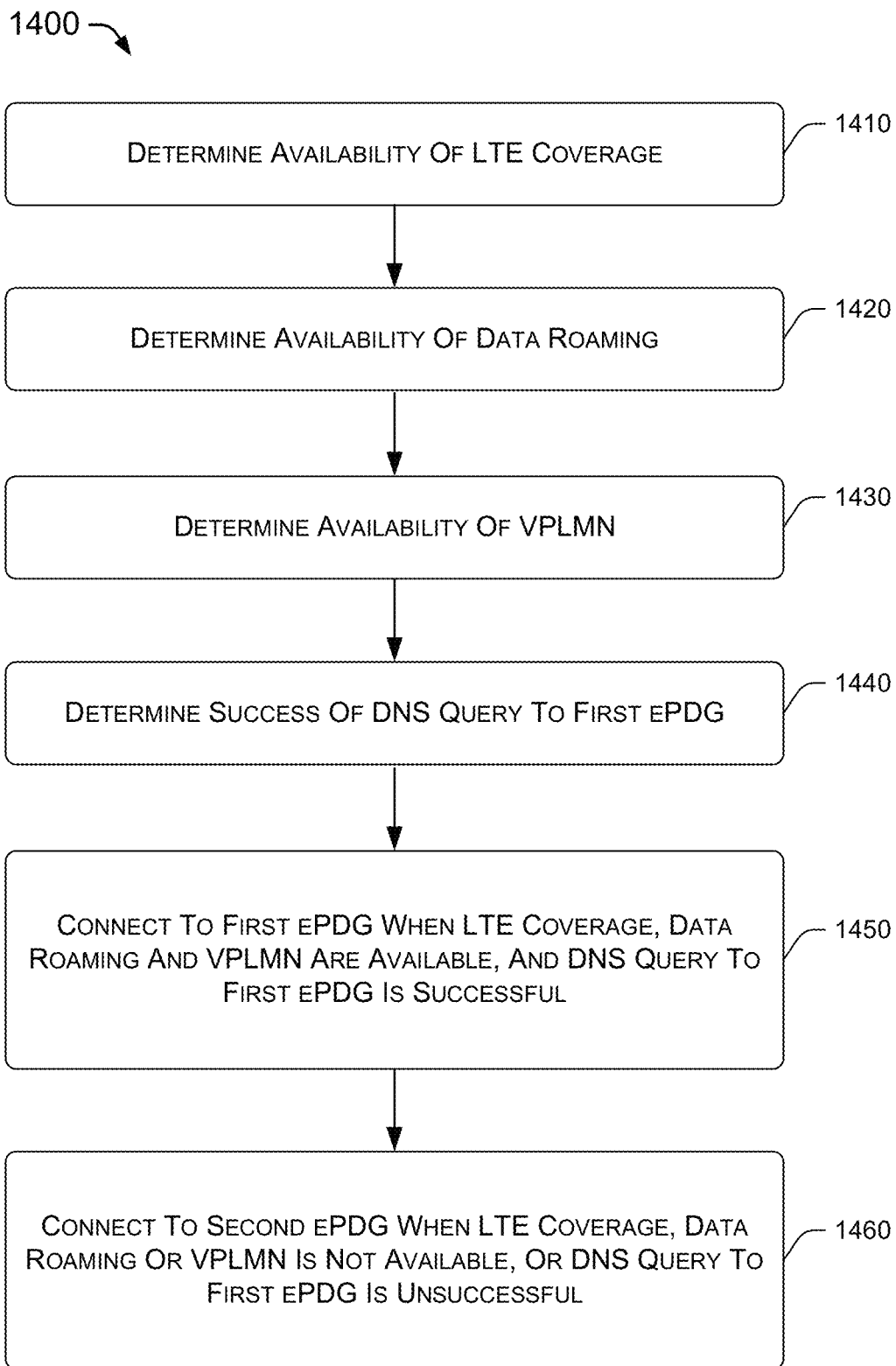
FIG. 14 is a flow diagram of an example process in accordance with the present disclosure.

FIG. 14 is a flow diagram of an example process 1400 in accordance with the present disclosure. Example process 1400 may represent one aspect of implementing features of various embodiments described above. Example process 1400 may include one or more operations, actions, or functions as illustrated by one or more of blocks 1410, 1420, 1430, 1440, 1450 and 1460. Although illustrated as discrete blocks, various blocks may be divided into additional blocks, combined into fewer blocks, or eliminated, depending on the desired implementation. Example process 1400 may be implemented by example device 1300, e.g., the one or more processors 1320 and communication unit 1330 thereof. For illustrative purposes, the operations described below are performed by example device 1300 as a mobile device. Example process 1400 may begin at block 1410.

Block 1410 (Determine Availability Of LTE Coverage) may involve example device 1300 determining whether any Long-Term Evolution (LTE) coverage is available. Block 1410 may be followed by block 1420.

Block 1420 (Determine Availability Of Data Roaming) may involve example device 1300 determining whether data roaming is available. Block 1420 may be followed by block 1430.

Block 1430 (Determine Availability Of VPLMN) may involve example device 1300 determining whether a VPLMN is available. Block 1430 may be followed by block 1440.

Block 1440 (Determine Success Of DNS Query To First ePDG) may involve example device 1300 determining whether a DNS query to a first ePDG is successful. The first ePDG may be, for example, a visited ePDG (VePDG). Block 1440 may be followed by block 1450.

Block 1450 (CONNECT TO FIRST EPDG WHEN LTE COVERAGE, DATA ROAMING AND VPLMN ARE AVAILABLE, AND DNS QUERY TO FIRST EPDG IS SUCCESSFUL) may involve example device 1300 connecting to the first ePDG responsive to a determination that LTE coverage is available, a determination that data roaming is available, a determination that a VPLMN is available, and a determination that the DNS query to the first ePDG is successful. Block 1450 may be followed by block 1460.

Block 1460 (CONNECT TO SECOND EPDG WHEN LTE COVERAGE, DATA ROAMING OR VPLMN IS NOT AVAILABLE, OR DNS QUERY TO FIRST EPDG IS UNSUCCESSFUL) may involve example device 1300 connecting to a second ePDG responsive to a determination that no LTE coverage is available, a determination that no data roaming is available, a determination that no VPLMN is available, or a determination that the DNS query to the first ePDG is unsuccessful. The second ePDG may be, for example, a home ePDG (HePDG).

In some embodiments, example process 1400 may further involve example device 1300 performing operations including: responsive to a determination that no LTE coverage is available, connecting to a Wi-Fi access point; registering to an IMS network; establishing data connectivity through the Wi-Fi access point; and establishing VoWiFi connectivity through the Wi-Fi access point.

In some embodiments, the registering to the IMS network may involve example device 1300 registering to the IMS network via an IMS APN through an ePDG IPSec tunnel.

In some embodiments, example process 1400 may further involve example device 1300 performing operations including: placing a 3GPP radio of the mobile device in a sleep mode; and periodically searching for a 3GPP RAT and a PLMN.

In some embodiments, example process 1400 may further involve example device 1300 enabling voice calls through the IMS network through the Wi-Fi access point.

In some embodiments, in enabling the voice calls through the IMS network example process 1400 may involve example device 1300 providing a seamless transition of a voice call over the IMS network from LTE to Wi-Fi and from Wi-Fi to LTE.

In some embodiments, example process 1400 may further involve example device 1300 performing operations including: enabling an IMS PDN IPSec tunnel; and routing RCS signals and media traffic through the IMS PDN IPSec tunnel.

In some embodiments, in enabling the IMS PDN IPSec tunnel example process 1400 may involve example device 1300 maintaining the IMS PDN IPSec tunnel on Wi-Fi when a RSSI level of Wi-Fi signals is above a threshold value.

In some embodiments, the threshold value may be −75 dBm.

In some embodiments, example process 1400 may further involve example device 1300 performing operations including: enabling an IMS PDN IPSec tunnel; and routing video calling signals and media traffic through the IMS PDN IPSec tunnel.

In some embodiments, in routing the video calling signals through the IMS PDN IPSec tunnel example process 1400 may involve example device 1300 providing a seamless transition of a video call through the IMS PDN IPSec tunnel from LTE to Wi-Fi and from Wi-Fi to LTE.

In some embodiments, in enabling the IMS PDN IPSec tunnel example process 1400 may involve example device 1300 maintaining the IMS PDN IPSec tunnel on Wi-Fi when a RSSI level of Wi-Fi signals is above a threshold value.

In some embodiments, the threshold value may be −75 dBm.

In some embodiments, example process 1400 may further involve example device 1300 initiating handover between LTE and Wi-Fi by considering one or more metrics including the following: a RSSI level, downlink and uplink packet error rates, RTCP information, and LTE RSRP and RSRQ information.

In some embodiments, example process 1400 may further involve example device 1300 performing operations including: detaching the 3GPP radio from the UMTS or GSM RAT in an event that IMS PDN connectivity is established on Wi-Fi and a 3GPP radio of the mobile device falls back from LTE to a UMTS or GSM radio RAT; placing the 3GPP radio in a sleep mode; and scanning for a LTE coverage.

In some embodiments, example process 1400 may further involve example device 1300 establishing, by an ePDG application on the mobile device, an IPSec tunnel.

In some embodiments, in establishing the IPSec tunnel example process 1400 may involve example device 1300 performing one or more of operations including: establishing and maintaining three or more PDN connections simultaneously; establishing the IPSec tunnel based on IPv4 and IPv6; selecting a first PLMN of a plurality of PLMNs as a home PLMN, identifications of the plurality of PLMNs stored in the mobile device; and supporting one or more static IP addresses and one or more FQDN for the second ePDG responsive to connecting to the second ePDG.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    determining, by a mobile device, whether any Long-Term Evolution (LTE) coverage is available;
    determining, by the mobile device, whether data roaming is available;
    determining, by the mobile device, whether a visited public land mobile network (VPLMN) is available;
    determining, by the mobile device, whether a domain name server (DNS) query to a first evolved packet data gateway (ePDG) is successful;
    connecting the mobile device to the first ePDG responsive to a determination that LTE coverage is available, a determination that data roaming is available, a determination that a VPLMN is available, and a determination that the DNS query to the first ePDG is successful;
    routing Session Initiation Protocol-Internet Protocol (IP) Multimedia Subsystem (SIP-IMS) traffic between the mobile device and a packet data network (PDN) gateway through via a Wi-Fi access point and the first ePDG while the mobile device is connected to the first ePDG, and routing over-the-top (OTT) applications traffic to an Internet service provider (ISP) network via the Wi-Fi access point while the mobile device is connected to the first ePDG; and connecting the mobile device to a second ePDG responsive to a determination that no data roaming is available or a determination that no LTE coverage is available.

2. The method of claim 1, wherein the connecting the mobile device to the second ePDG comprise:
connecting the mobile device to the ISP network via the Wi-Fi access point; and
registering the mobile device to an Internet Protocol (IP) Multimedia Subsystem (IMS) network via an IMS access point name (APN) through an ePDG Internet Protocol Security (IPSec) tunnel.

3. The method of claim 2, further comprising:
establishing data connectivity through the Wi-Fi access point; and
establishing voice over Wi-Fi (VoWiFi) connectivity through the Wi-Fi access point.

4. The method of claim 2, further comprising:
placing a 3$^{rd}$ Generation Partnership Project (3GPP) radio of the mobile device in a sleep mode; and
periodically searching for a 3GPP radio access technology (RAT) and a public land mobile network (PLMN).

5. The method of claim 2, further comprising: enabling voice calls through the IMS network through the Wi-Fi access point.

6. The method of claim 5, wherein the enabling of the voice calls through the IMS network comprises providing a seamless transition of a voice call over the IMS network from LTE to Wi-Fi and from Wi-Fi to LTE.

7. The method of claim 2, further comprising:
enabling an IMS packet data network (PDN) Internet Protocol Security (IPSec) tunnel; and
routing rich communication services (RCS) signals and media traffic through the IMS PDN IPSec tunnel.

8. The method of claim 7, wherein the enabling of the IMS PDN IPSec tunnel comprises maintaining the IMS PDN IPSec tunnel on Wi-Fi when a received signal strength indication (RSSI) level of Wi-Fi signals is above a threshold value.

9. The method of claim 8, wherein the threshold value is −75 dBm.

10. The method of claim 2, further comprising:
enabling an IMS packet data network (PDN) Internet Protocol Security (IPSec) tunnel; and
routing video calling signals and media traffic through the IMS PDN IPSec tunnel.

11. The method of claim 10, wherein the routing of the video calling signals through the IMS PDN IPSec tunnel comprises providing a seamless transition of a video call through the IMS PDN IPSec tunnel from LTE to Wi-Fi and from Wi-Fi to LTE.

12. The method of claim 10, wherein the enabling of the IMS PDN IPSec tunnel comprises maintaining the IMS PDN IPSec tunnel on Wi-Fi when a received signal strength indication (RSSI) level of Wi-Fi signals is above a threshold value.

13. The method of claim 12, wherein the threshold value is −75 dBm.

14. The method of claim 1, further comprising:
determining, by the mobile device, that LTE coverage is available following connection of the mobile device to the second ePDG via the Wi-Fi access point;
initiating handover between LTE and Wi-Fi by considering one or more metrics comprising:
a received signal strength indication (RSSI) level;
downlink and uplink packet error rates;
Real-time Transport Protocol (RTP) Control Protocol (RTCP) information; and
LTE reference signal received power (RSRP) and reference signal received quality (RSRQ) information.

15. The method of claim 1, wherein the connecting the mobile device to the second ePDG includes establishing IMS packet data network (PDN) connectivity via the Wi-Fi access point, further comprising:
attaching a 3$^{rd}$ Generation Partnership Project (3GPP) radio of the mobile device to an LTE network while the mobile device is connected to the second ePDG via the Wi-Fi access point;
making a determination, by the mobile device, that the (3GPP) radio of the mobile device fell back from the LTE network to a Universal Mobile Telecommunications System (UMTS) or Global System for Mobile Communications (GSM) radio access technology (RAT); and
in response to the determination, detaching the 3GPP radio of the mobile device from the UMTS or GSM RAT, and placing the 3GPP radio in a sleep mode in order to scan for a LTE coverage.

16. The method of claim 1, further comprising: establishing, by an ePDG application on the mobile device, an Internet Protocol Security (IPSec) tunnel.

17. The method of claim 16, wherein the establishing of the IPSec tunnel comprises performing one or more of operations comprising:
establishing and maintaining three or more packet data network (PDN) connections simultaneously;
establishing the IPSec tunnel based on Internet Protocol version 4 (IPv4) and Internet Protocol version 6 (IPv6);
selecting a first public land mobile network (PLMN) of a plurality of PLMNs as a home PLMN, identifications of the plurality of PLMNs stored in the mobile device; and
supporting one or more static IP addresses and one or more fully qualified domain names (FQDN) for the second ePDG responsive to connecting to the second ePDG.

18. A device, comprising:
a memory configured to store data and one or more sets of processor-executable instructions; and
a processor coupled to the memory, the processor configured to access the memory to execute the one or more sets of processor-executable instructions to perform operations comprising:
determining whether to connect to a first evolved packet data gateway (ePDG) or a second ePDG by performing operations comprising:
determining, by a mobile device, whether any Long-Term Evolution (LTE) coverage is available;
determining, by the mobile device, whether data roaming is available;
determining, by the mobile device, whether a visited public land mobile network (VPLMN) is available;
determining, by the mobile device, whether a domain name server (DNS) query to the first ePDG is successful;
connecting the mobile device to the first ePDG responsive to a determination that LTE coverage is available, a determination that data roaming is available, a determination that a VPLMN is available, and a determination that the DNS query to the first ePDG is successful; and connecting the mobile device to the second ePDG responsive to a determination that no data roaming is available while the VPLMN is available, or a determination that no LTE coverage is available while the VPLMN is available.

19. The device of claim 18, wherein the processor is configured to further perform one or more operations comprising:
- placing a $3^{rd}$ Generation Partnership Project (3GPP) radio of the mobile device in a sleep mode;
- periodically searching for a 3GPP radio access technology (RAT) and a public land mobile network (PLMN);
- enabling voice calls through an IMS network through a Wi-Fi access point;
- enabling an IMS packet data network (PDN) Internet Protocol Security (IPSec) tunnel;
- routing rich communication services (RCS) signals and media traffic through the IMS PDN IPSec tunnel;
- routing video calling signals and media traffic through the IMS PDN IPSec tunnel;
- determining, by the mobile device, that LTE coverage is available following connection of the mobile device to the second ePDG via the Wi-Fi access point; and
- initiating handover between LTE and Wi-Fi by considering one or more metrics comprising:
  - a received signal strength indication (RSSI) level;
  - downlink and uplink packet error rates;
  - Real-time Transport Protocol (RTP) Control Protocol (RTCP) information; and
  - LTE reference signal received power (RSRP) and reference signal received quality (RSRQ) information.

20. The device of claim 19, wherein in enabling of the voice calls through the IMS network the processor is configured to provide a seamless transition of a voice call over the IMS network from LTE to Wi-Fi and from Wi-Fi to LTE, wherein in enabling the IMS PDN IPSec tunnel the processor is configured to maintain the IMS PDN IPSec tunnel on Wi-Fi when a RSSI level of Wi-Fi signals is above a threshold value of −75 dBm, wherein in routing the video calling signals through the IMS PDN IPSec tunnel the processor is configured to provide a seamless transition of a video call through the IMS PDN IPSec tunnel from LTE to Wi-Fi and from Wi-Fi to LTE, and wherein in establishing the IPSec tunnel the processor is configured to perform one or more of operations comprising:
- establishing and maintaining three or more PDN connections simultaneously;
- establishing the IPSec tunnel based on Internet Protocol version 4 (IPv4) and Internet Protocol version 6 (IPv6);
- selecting a first PLMN of a plurality of PLMNs as a home PLMN, identifications of the plurality of PLMNs stored in the mobile device; and
- supporting one or more static IP addresses and one or more fully qualified domain names (FQDN) for the second ePDG responsive to connecting to the second ePDG.

* * * * *